US007558961B2

(12) United States Patent
Sharma et al.

(10) Patent No.: US 7,558,961 B2
(45) Date of Patent: Jul. 7, 2009

(54) SYSTEMS AND METHODS FOR EMBEDDING MESSAGES IN LOOK-UP TABLES

(75) Inventors: Gaurav Sharma, Webster, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 939 days.

(21) Appl. No.: 11/110,813

(22) Filed: Apr. 21, 2005

(65) Prior Publication Data

US 2006/0242416 A1    Oct. 26, 2006

(51) Int. Cl.
*H04L 21/00* (2006.01)
(52) U.S. Cl. ..................................... 713/176
(58) Field of Classification Search ................ 713/176
See application file for complete search history.

(56) References Cited

U.S. PATENT DOCUMENTS

| 6,590,996 | B1 * | 7/2003 | Reed et al. .................. 382/100 |
| 7,222,235 | B1 * | 5/2007 | Mitsui ......................... 713/176 |
| 7,391,880 | B2 * | 6/2008 | Reed et al. .................. 382/100 |

OTHER PUBLICATIONS

"A color image watermarking scheme based on color quantization", Tsai et al, 2003.*

* cited by examiner

*Primary Examiner*—Andrew L Nalven
(74) *Attorney, Agent, or Firm*—Oliff & Berridge, PLC

(57) ABSTRACT

System and methods provide a message, generated based on a message authentication code (MAC), embedded in a look-up table associated with an image. The embedding of the message does not affect the image. The message may be used to authenticate the image.

27 Claims, 20 Drawing Sheets

COLUMN WITH LUT INDICES

COLUMN WITH LUT ENTRIES

| | |
|---|---|
| $I_1$ | $R_1G_1B_1$ |
| $I_2$ | $R_2G_2B_2$ |
| ... | ... |
| $I_K$ | $R_KG_KB_K$ |
| ... | ... |
| $I_N$ | $R_NG_NB_N$ |

*FIG. 21*

SYSTEMS AND METHODS FOR EMBEDDING MESSAGES IN LOOK-UP TABLES

BACKGROUND

Many electronic images have an associated look-up table that describes pixel values found in an image. For example, a palettized color image may have an associated color palette table that describes the colors found in the image. Typically, this color table is 256 or 65,536 entries long and contains RGB (red, green, blue) values associated with the image pixels. The image pixels are associated with the RGB values via indices.

Watermarking of digital images provides a way for copyright enforcement and image authentication or verification. For example, watermarking may be used to detect changes in image data, thus verify whether a given image came from a trusted source.

SUMMARY

Watermarks are typically designed to implement directly on image data. They usually require that the image data be preserved in the watermarked state. Thus, images that are palettized, such as color-mapped, to begin with, can usually not be stored in the original palettized form after watermarking. More generally, for a vector quantized image with pixels corresponding to codebook entries, watermarking will result in pixel values which no longer correspond to the original codebook entries. Consequently, the image cannot be saved in the original vector quantized form.

The order in which the RGB values occur in a palette table does not affect the image itself. In particular, the order in which the RGB values occur in the table may be arbitrary. For example, in an image with a palette of N colors, the number of possible different orders or arrangements in which palette entries may be entered is N!. Permuting the positions of two entries in the table will not change the image if corresponding permutation is also made to the association between the pixels and the entries. Thus, a message may be embedded in the table by choosing a unique order in which the entries are entered in the table. In particular, instead of working directly on image data to obtain a watermark, a message may be embedded in the color table or a look-up table (LUT) by selecting a particular order of palette entries. The embedded message may function as a watermark. In particular, the embedded message may be subsequently extracted for verification of image integrity, i.e., by detecting if the image has been altered or manipulated in any way.

For example, a method may be provided for embedding a message in a look-up table (LUT) for a data set, the LUT including a plurality of entries for a plurality of values, each of the plurality of values providing information regarding the data set, each of the plurality of entries capable of being used for one of the plurality of values, the plurality of values capable of being arranged in the entries of the LUT in a plurality of arrangements. The method may include: obtaining a message, the message providing information other than the information regarding the data set; selecting an arrangement from the plurality of arrangements based on the message; and arranging the plurality of values in the LUT based on the selected arrangement.

Also, a method may be provided for verifying an image using a message authentication code (MAC) embedded in a lookup table (LUT) of the image, the LUT containing values, the message authentication code (MAC) generated by encrypting a characteristic of the image using a private key of an encryption system. The method may include: determining a sequenced set of indices from the LUT contained in the image; extracting a message by examining the sequenced indices; and obtaining the message authentication code (MAC) from the extracted message.

A look-up table (LUT) for a data set may include: a plurality of entries, and a plurality of values, each of the plurality of values providing information regarding the data set, each of the plurality of entries capable of being used for one of the plurality of values, the plurality of values capable of being arranged in the entries of the LUT in a plurality of arrangements, the LUT may further include a message embedded in the LUT by a selection of an arrangement from the plurality of arrangements, the message providing information other than the information regarding the data set, wherein the plurality of values are arranged in the plurality of entries based on the selection of the arrangement.

These and other features and details are described in, or are apparent from, the following detailed description.

BRIEF DESCRIPTION OF THE DRAWINGS

Various exemplary details of system and methods are described, with reference to the following figures, wherein:

FIG. 21 illustrates an exemplary look up table (LUT) with a message embedded in look up table (LUT) indices;

DETAILED DESCRIPTION OF EMBODIMENTS

Figure 1:
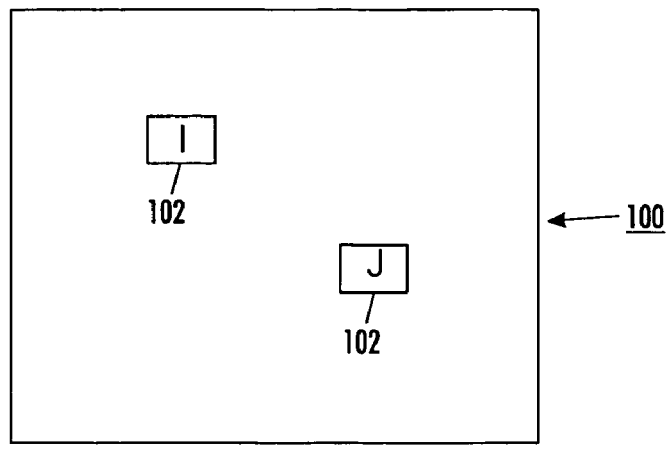
FIG. 1 illustrates an exemplary image.

Entries of a lookup table may be arranged in the lookup table in any order. For example, the entries may be entered in the lookup table in an order in which values associated with the entries sequentially increase. For example, for a lookup table having four spaces for four entries 0, 1, 2 and 3, these entries may be entered with 0 being entered in the first space, 1 being entered in the second space, followed by 3 and 4 being entered in the third and fourth spaces, respectively. In such an order, the values of the entries sequentially increase from the first space to the fourth space.

Alternatively, the entries 0, 1, 2 and 3 may be entered in other orders. For example, 2 may be entered in the first space, 0 the second space, followed by 1 and 3 in the third and fourth spaces, respectively. In this way, the values of the entries fluctuate, instead of sequentially increasing, from the first space to the fourth space.

When the lookup table is associated with an image, changing the order of the entries from the first order to the second order, as discussed above, will not affect the image, as long as the association between the image pixels and the entries remains the same. The association may remain the same if corresponding changes are made to the assignment between the image pixels and the spaces in the lookup table. In the example above, the image will not be affected if a pixel associated with entry "0" remains associated with entry "0." This may be accomplished by correspondingly changing the assignment of the pixel from the first space to the second space.

Thus, the order of the entries may be intentionally altered to embed a message. In particular, the message may be generated based on an encryption of a characteristic of, for example, the image associated with the lookup table. The lookup table may then be transmitted to a receiver. The characteristic may also be transmitted to the receiver. The transmission of the characteristic may be in the form of transmitting the image.

Upon receiving the lookup table and the characteristic, the receiver may compare the order in which entries are entered in the lookup table against a standard order, such as, for example, a sequentially increasing order. The embedded message may be extracted based on the comparison. The extracted message may be subsequently decrypted to reveal the characteristic. The decrypted characteristic and the received characteristic may be compared. Such a comparison may be used in an authentication process.

For example, when authenticating an online token, which may be used as online currency, the image of the token may be authenticated by the lookup table associated with the image. A system that performs such authentication may be implemented in an apparatus, such as, for example, an apparatus installed in a shopping center, a portable apparatus carried around by an inspector, or the like. Similar applications include authentication of electronic signatures, electronic art work, and the like. Also, a system that embeds a message may be implemented in an apparatus, such as, for example, an apparatus installed in a shopping center for customers to make payment using online token, a portable apparatus to be carried around by customers to make payment, or the like.

Thus, as discussed in greater detail below, systems and methods provide a message, generated based on a message authentication code (MAC), embedded in a look-up table associated with an image. The embedding of the message does not affect the image. The message may be used to authenticate the image.

The following description frequently refers to palettized color images with associated palette tables, such as, for example, color code tables. However, the same principles are applicable to systems and methods for embedding messages in any look-up tables by uniquely ordering values in the look-up table. More generally, the same principles are applicable to vector quantized (VQ) images through the manipulation of VQ-codebooks.

For color mapped images, each image pixel may be represented by a symbol, such as an 8-bit symbol, which is interpreted as a color value based on the palette associated with the color image. The palette may be a table that lists symbols with their corresponding color values.

The symbols in the palette table may be permuted in any order with the image remaining unchanged, provided that the same permutation is also applied to the symbols constituting the image. Thus, the ordering of the symbols may itself be used as a message. For example, for a color palette stored along with a color image, the information on the ordering of the symbols in the palette may be used to store a message. For example, if entries having values normally would be entered in a table in such an order that the values would sequentially increase, an order in which the values do not sequentially increase will indicate a special order and that a message is embedded by use of this special order.

Figure 2:
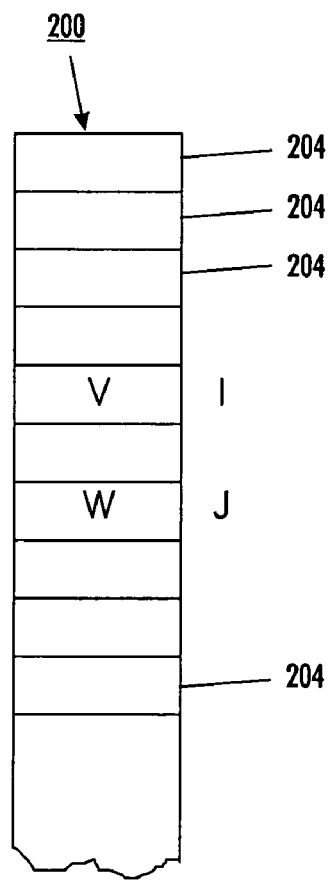
FIG. 2 illustrates a look-up table associated with the image shown in FIG. 1.

FIGS. 1 and 2 illustrate an image 100 and a look-up table 200 associated with the image 100. The image 100 may be a palettized color image, and the look-up table 200 may be, accordingly, a palette table, also called a color code table. In general, the image 100 may be a vector quantized image, and the look-up table 200 may be, accordingly, a vector quantized codebook.

The image 100 may contain a plurality of pixels 102. Each pixel may be associated with an index. Each index may correspond to a position 204 in the look-up table 200. For example, the positions 204 may correspond to a sequence number in the order of entry in the look-up table 200.

The look-up table 200 may contain a plurality of values. Each value is associated with a position 204. For example, in FIG. 1, the value "V" is associated with, and identified by, a position 204 corresponding to an index "I." Similarly, a value "W" in the look-up table 200 may be associated with and identified by a position 204 that is associated with the index "J."

Figure 3:
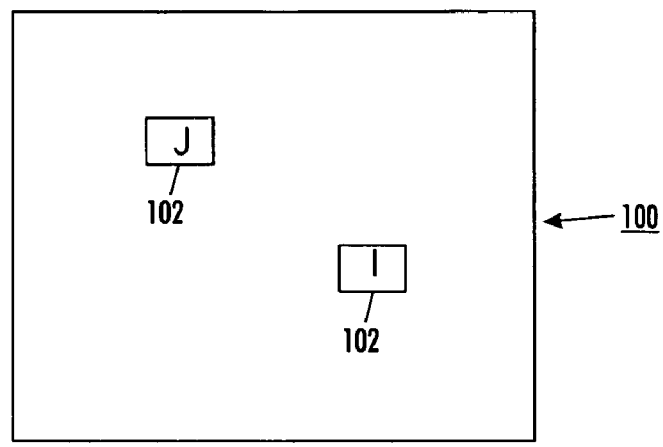
FIGS. 3 and 4 further illustrate the image and the look-up table in FIGS. 1 and 2, respectively.
Figure 4:
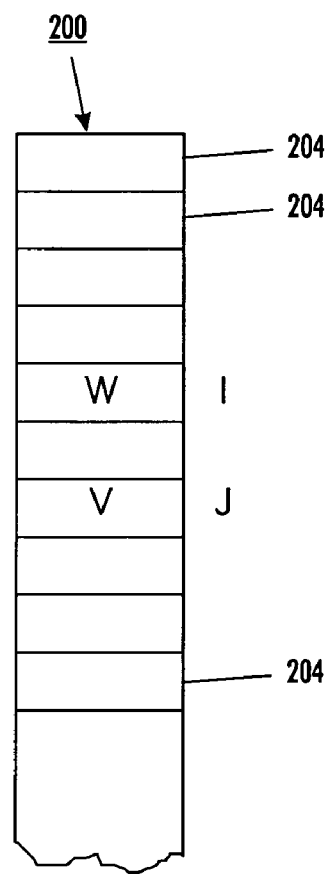

When the positions of the values "V" and "W" are changed in the look-up table 200, the image 100 will not be affected if the indices "I" and "J" are also changed accordingly. For example, in FIGS. 3 and 4, the positions of the values "V" and "W" are switched, as compared to their positions in FIGS. 1 and 2. The corresponding indices "I" and "J" of the pixels 102 in image 100 are also switched accordingly. Thus, the pixel 102 associated with value "V" via index "I" in FIGS. 1 and 2 is still associated with value "V" with the index "J." Thus, the image remains unchanged because its pixels remain associated with the original values. Accordingly, the values in the look-up table 200 may be rearranged to a particular order without affecting the image 100.

Figure 5:
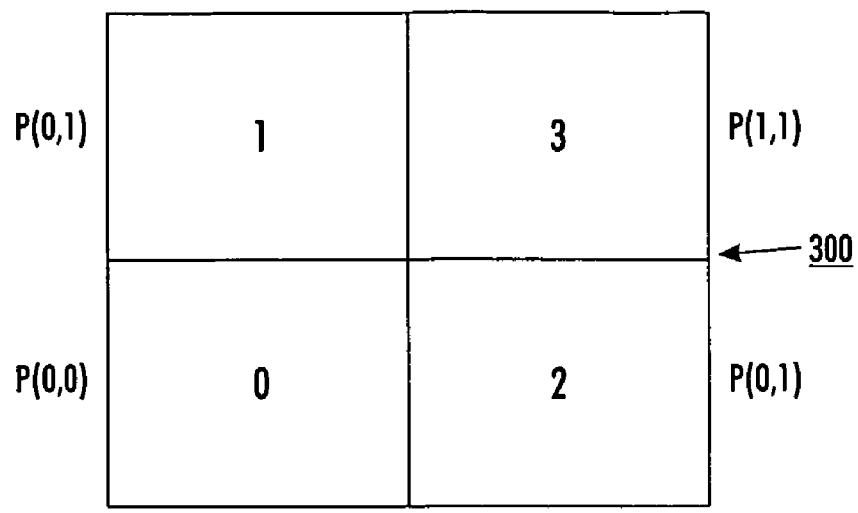
FIG. 5 illustrates another exemplary image.

FIGS. 5-8 illustrate another example in which rearranging values in a look-up table does not affect an image if the association of the pixels of the image is correspondingly rearranged. As shown in FIG. 5, image 300 is a 2×2 color image with four pixels P (0,1), P (1,1), P (0,0) and P (0,1). Each pixel is associated with an index. For example, pixel P (0,1) is associated with index "1." Although not indicated in the example shown in FIG. 5, two or more pixels may be associated with a same index. For example, two pixels in a palettized image may have the same color. Thus, the two pixels will both be associated with the index that indicates the position of that color in the palette table.

Figure 6:
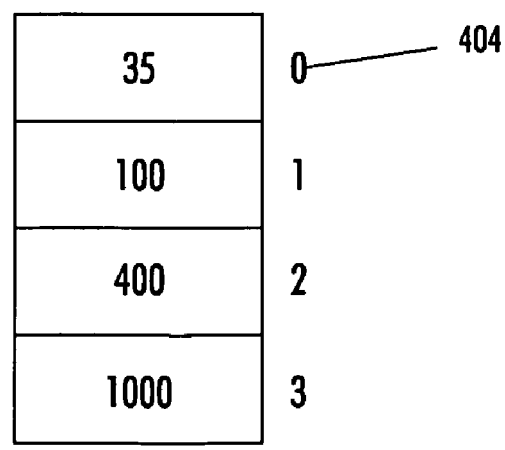
FIG. 6 illustrates a look-up table associated with the image shown in FIG. 5.

As shown in FIG. 6, each index indicates a position 404 in a look-up table 400. The look-up table 400 may be a palette having values, with the position of each value indicated by position 404. For example, the value "100" resides at position "1," which is the first entry position of look-up table 400. The value "100" may indicate a particular RGB combination, resulting in a particular color.

Figure 7:
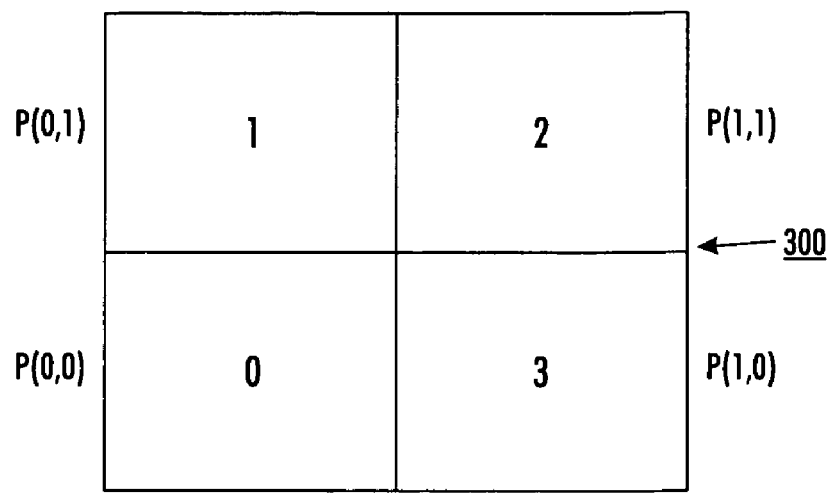
FIGS. 7 and 8 further illustrate the image and the look-up table of FIGS. 5 and 6, respectively.
Figure 8:
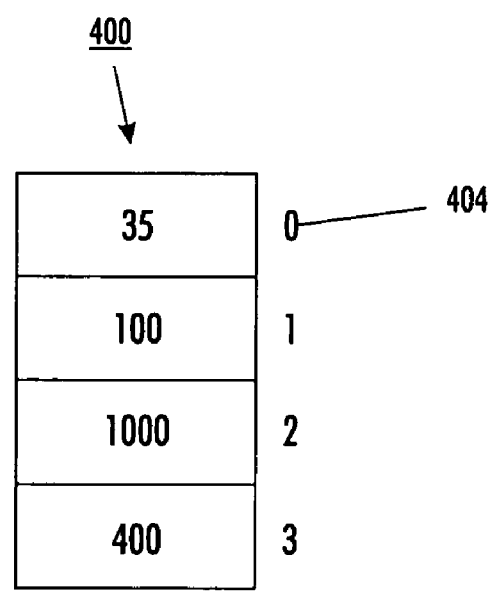

In FIG. 8, the positions of the values "400" and "1000" are switched, as compared to their positions shown in FIG. 6. Consequently, the association of the index "2" and "3" with the values is changed. However, the image 300 remains unaffected, as long as the association between pixels P (1,1) and P (1,0) and the indices "2" and "3," respectively, is also switched, as shown in FIG. 7.

Figure 9:
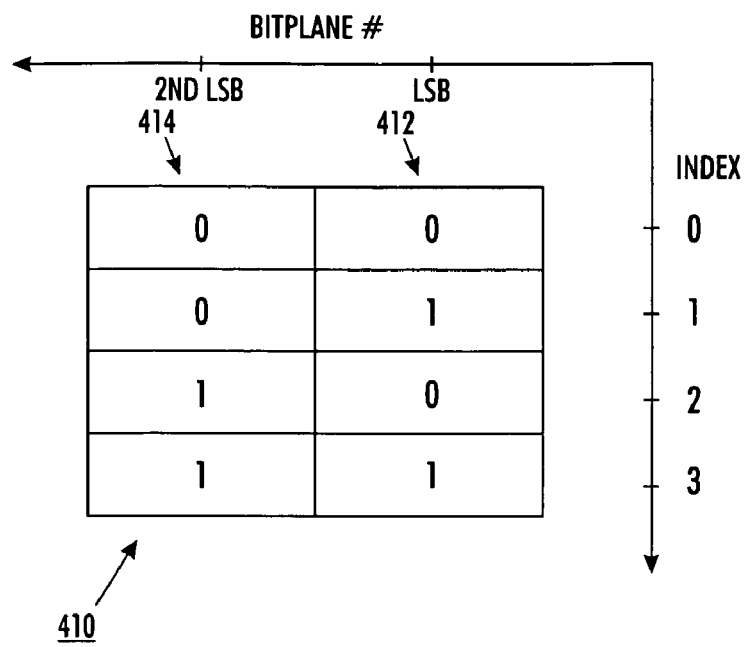
FIG. 9 illustrates bit planes of the indices of the look-up table of FIG. 8.

FIG. 9 illustrates the bit planes of the indices associated with the positions 404 of look-up table 400 in FIG. 5. As shown in FIG. 9, the indices 0, 1, 2 and 3 have binary expressions of 00, 01, 10 and 11, respectively. The binary expressions of the indices are listed in table 410 in FIG. 1, in an order in which the indices sequentially increase.

The right-hand side column 412 of table 410 is a bit plane containing the least significant bits (LSB) of the indices. The left-hand side column of table 410 contains the second least significant bit (second LSB) of the indices. In the example shown in FIG. 9, the second least significant bit is also the most significant bit (MSB), because each index only has two bits.

For the look-up table 400 in FIG. 5, there are only four entries to accommodate the four values. Thus, the number of indices is four. Accordingly, in FIG. 9, each of bit planes 412 and 414 has four binary bits. Also, because each of the indices 0, 1, 2 and 3 appears only once in the look-up table 400 on FIG. 5, in each of the bit planes 412 and 414 of FIG. 9, there are two, and only two, zeros ("0") and ones ("1"). In particular, in each bit plane, the number of zeros in each bit plane is half the number of the indices. That is, when the number of indices is 4, the number of zeros is two. Similarly, the number of ones in each bit plane is also half the number of the indices.

Figure 10:
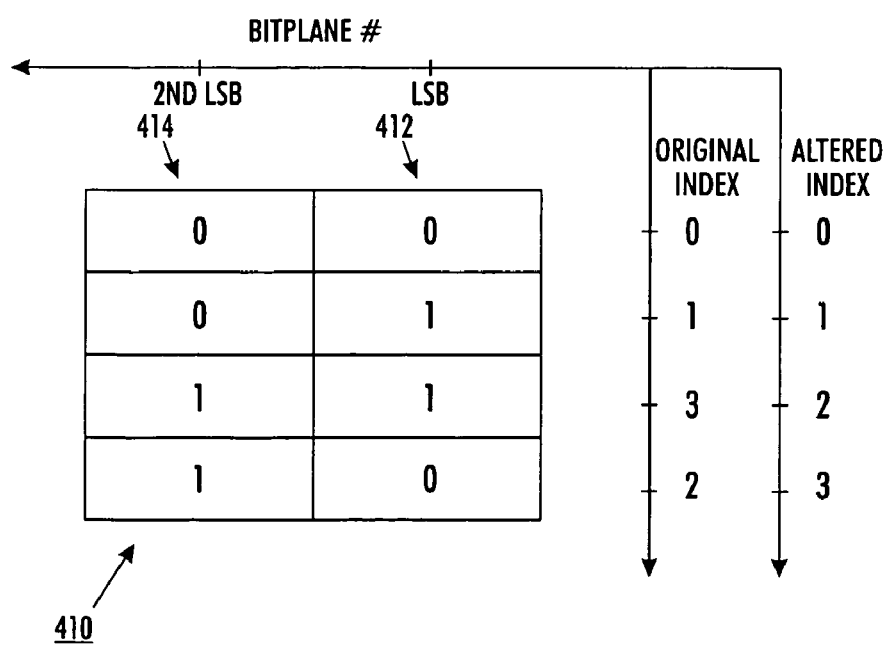
FIG. 10 illustrates an exemplary method for embedding a message in the bit planes of the indices of the look-up table of FIG. 8.

As discussed above, the values in the look-up table may be rearranged to embed a message without affecting the image associated with the look-up table. FIG. 10 illustrates a method in which a message "0100" is embedded in the bit planes of the indices, as discussed below.

In the example shown in FIG. 10, the embedding starts at the least significant bit plane 412 of the table 410. Thus, the first two bits "01" of the message "0100" are entered into the top two spaces in the least significant bit plane 412.

As discussed above, the number of zeros or the number of ones in a bit plane is half the number of the indices. When the number of the indices is four, the number of zeros in bit plane 412 may only be up to two. Thus, the last two bits "00" of the message "0100" may not be entered into the bottom two spaces of the least significant bit plane 412, because such an entry would result in the least significant bit plane 412 having three zeros, which is greater than two.

In general, according to the method showing in FIG. 10, only the top two bits in the least significant bit plane may be used in embedding a message. This is to ensure the flexibility of embedding a message which may contain an arbitrary number of zeros and ones, without violating the restriction that the number of zeros (or ones) in each bit plane may only be as large as half of the number of indices. For example, if the message is "0000" or "0001," allowing the 3rd or 4th bits in the least significant bit plane to represent the message would result in having three or four zeros in that bit plane, thus violating the restriction. Thus, the bottom half bits of the least significant bit plane are not used for embedding the message.

In particular, in the example shown in FIG. 10, the bottom two bits in the least significant bit plane are not used for representing the last two bits "00" of the message "0100." Rather, the bottom two spaces in this bit plane are provided with values "1,0" that supplement the values "0,1" entered in the top two spaces, such that the number of zeros and the number of ones in this bit plane are both two, half the number of the indices.

The last two bits "00" of the message "0100" are entered in the second least significant bit plane 414. In particular, as shown in FIG. 10, a "0" is entered in the top space of the bit plane 414. Such an entry may be made without any concern of the requirement that the total number of zeros or ones may not exceed a certain number, or the requirement that the binary expression of any index may not appear more than once in table 410. Generally, the first entry of a bit plane is available for any entry.

However, starting from the second space in the bit plane 414, a concern may arise regarding restrictions that the entries in the first and second rows in table 410 should not be the same. For example, the first row of table 410 is already "0, 0." If the second space in bit plane 412 were zero, no zero would be permitted to enter in the second space in the bit plane 414, because such an entry would make the second row of table 410 "0, 0," which would be identical to the first row. Consequently, both the first and second rows of table 410 would impermissibly correspond to the binary expression of the index "0." Under such circumstances, the second space of the bit plane 414 would become unavailable for representing the message, and the last bit "0" of the message "0100" would have to be entered in one of the bottom two spaces of the bit plane 414.

In the example shown in FIG. 10, because the second space of the bit plane 412 contains a "1," the last bit "0" of the message "0100" may be entered in the second space of the bit plane 414. Thereafter, the bottom two spaces of bit plane 414 are filled with "1,1" which are the only numbers that remain available. At this point, the complete message "0100" has been embedded in the bit planes of the indices.

As shown in FIG. 10, after embedding the message "0100," the row 1, row 2, row 3 and row 4 of table 410 now read "0, 0," "0, 1," 1, 1" and "1, 0," respectively. They correspond to the binary expressions of indices 0, 1, 3 and 2, respectively, as shown in FIG. 10 along the axis "original index." The order in which these expressions are listed in table 410 does not follow an order in which the indices sequentially increase. In particular, rows 1-4 of table 410 now correspond to an order of 0, 1, 3, 2, instead of the sequentially increasing order of 0, 1, 2, 3. Thus, the indices, as listed in table 410, are now out of order. They are no longer in a sequentially increasing order.

Figure 11:
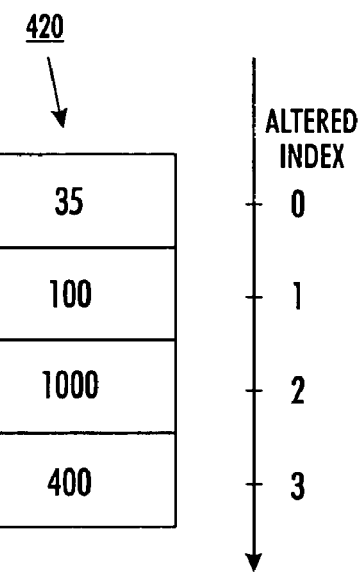
FIG. 11 illustrates the look-up table of FIG. 8 with a set of altered indices.

The indices may be altered or renamed to restore an order, such as a sequentially increasing order of 0, 1, 2 and 3, as shown in FIG. 10 along the axis "altered index." In the altered indices, the index 2 and 3 are switched relative to the original indices. FIG. 11 illustrates a look-up table resulting from a rearrangement of values according to the embedding of the message discussed in connection with FIG. 10. As shown in FIG. 11, the bottom two values in look-up table 420 are switched relative to the bottom two values in the look-up table 400 in FIG. 6.

The altered indices, as shown in FIG. 10, do not correspond to the binary expressions in table 410. For example, the binary expression in the third row of table 410, which is "1, 1," does not correspond to the altered index "2." Thus, after embedding a message and altering the indices to restore an original order, such as a sequentially increasing order, of the indices, the binary expressions of the altered indices will not correspond to the binary expressions listed in the bit planes. Of course, as discussed above, such an alteration index order in the color table will not affect the image, as long as the association of image pixel with the indices is correspondingly altered. A purpose of altering the indices is to embedded a message, which may be detected by a process that is reverse to the above-discussed embedding process, as discussed in greater detail below.

The method for embedding a message in the bit planes may be used in "reverse" in a process for detecting a message embedded in the bit planes of the indices of a look-up table. For example, after receiving an image with a look-up table, such as the look-up table 420 of FIG. 11, a receiver may extract an embedded message from the LUT using the such a "reverse" process. The receiver may also be a user who manually detects the message. It then may verify that message using the hash function of the image, or using the remaining bits in each bit plane as a confirmation. For example, the bits in the bit plane not used for messaging may be in reverse or mirror order of the message bits of that plane.

When comparing the values in table 420 against a reference order, such as an order in which the values should sequentially increase, the receiver may find that the third value "1000" in table 420 should have an index "3" in the sequentially increasing order, and that the fourth value "400" should have an index "2." Thus, when the values in table 420 are substituted by their indices in the sequentially increasing order, the receiver may identify a list "0, 1, 3, 2." This list corresponds to the "original index" in FIG. 10.

In the "reverse" method, the reference order may be an order other than a sequentially increasing order, as long as the order is known to the receiver. More generally, if a reference order is not explicitly provided, an order may be implied or assumed, based on a standard order, that may be used for comparison.

Using the list "0, 1, 3, 2," the receiver may obtain a table, with each row of the table corresponding to the binary expression of the element in the list. Such a table would be substantially identical to table 410 of FIG. 10. Subsequently, the receiver may extract the first two bits "01" from the least significantly bit plane 412 as the first two bits of a message. Similarly, the receiver may extract the third bit "0" of the message from the top space of the second least significantly bit plane 414.

The receiver may further determine that the second space of bit plane 414 could have contained either "0" or "1," because entering either "0" or "1" would not have violated any restrictions in a message-embedding process. Thus, the receiver may determine that the "0" in the second space of bit plane 414 is the last bit of the message. Accordingly, the receiver may extract the whole message "0100."

In FIG. 10, the message "0100" was embedded by first filling the available spaces in the least significant bit plane 412. However, the embedding process did not have to begin with the least significant bit plane 412. For example, the embedding process may begin with the second least significant bit plane 414.

Figure 12:
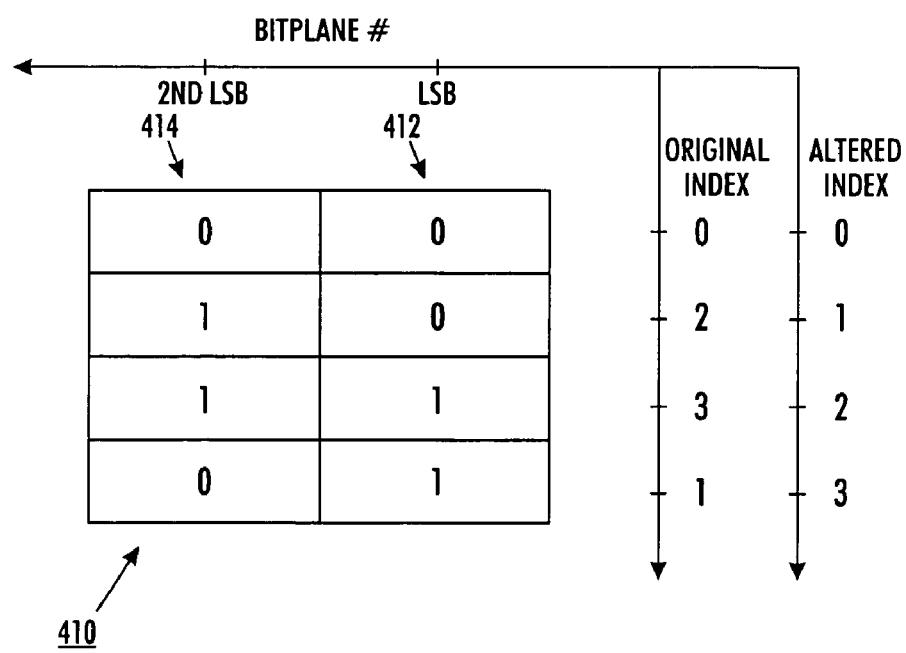
FIG. 12 illustrates another exemplary method for embedding a message in the bit planes of the indices of the look-up table of FIG. 8.

FIG. 12 illustrates a method in which a message-embedding process begins at the most significant bit plane 414, which coincides with the second least significant plane in this example. The same process discussed in connection with FIG. 10 applies here. As shown in FIG. 12, the second least significant bit plane 414 is filled with "0,1,1,0," and the least significant bit plane 142 is filled with "0,0,1,1." Thus, the process in FIG. 12 results in a different reordering of the original indices. In particular, the original indices are reordered as "0, 2, 3, 1." A rearrangement of the values in the look-up table may be used to detect the embedded message, with the knowledge that the message was embedded starting from the second least significant bit plane.

In addition, the embedding process may begin with the first or second least significant bit plane 412 or 414, respectively, starting from the bottom, instead of from the top.

Figure 13:
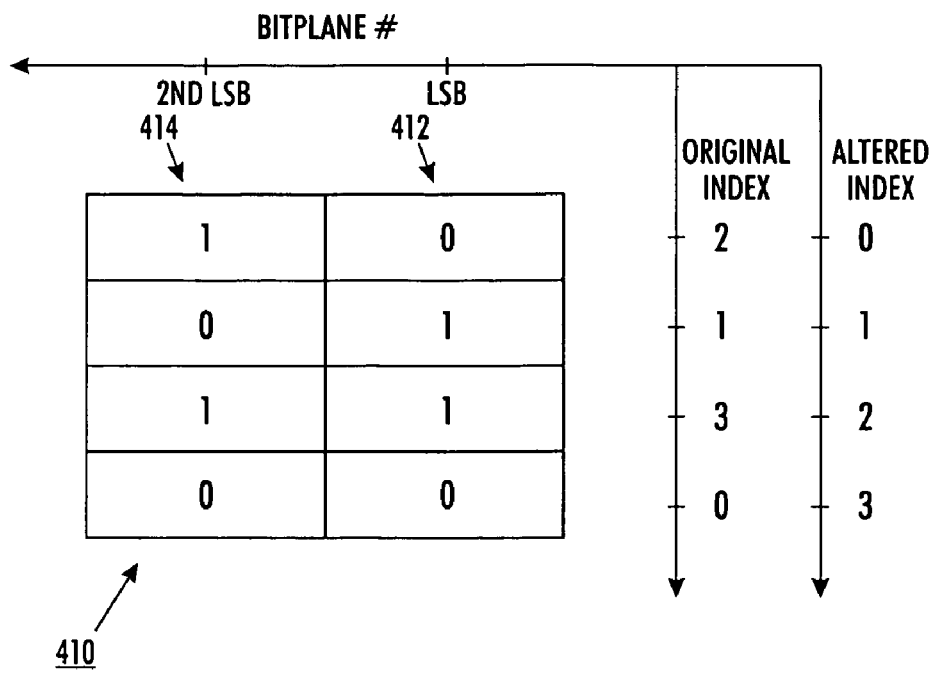
FIG. 13 illustrates an exemplary method for embedding another message in the bit planes of the indices of the look-up table of FIG. 8.
Figure 14:
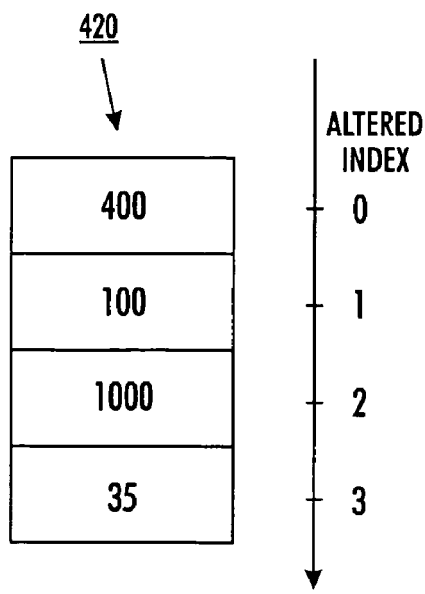
FIG. 14 illustrates the look-up table of FIG. 8 having another set of altered indices.

FIGS. 9 and 10 illustrate a process of embedding a message "0110." As shown in FIG. 13, the first two bits "01" of the message "0110" are entered in the top two spaces in the least significant big plane 412, and the last two bits "10" are entered in the top two spaces in the second least significant bit plane 414. This embedding process results in the original indices being rearranged in the order "2, 1, 3, 0." FIG. 14 illustrates a look-up table containing the values rearranged according to the altered indices which reflect the embedding of the message.

Figure 15:
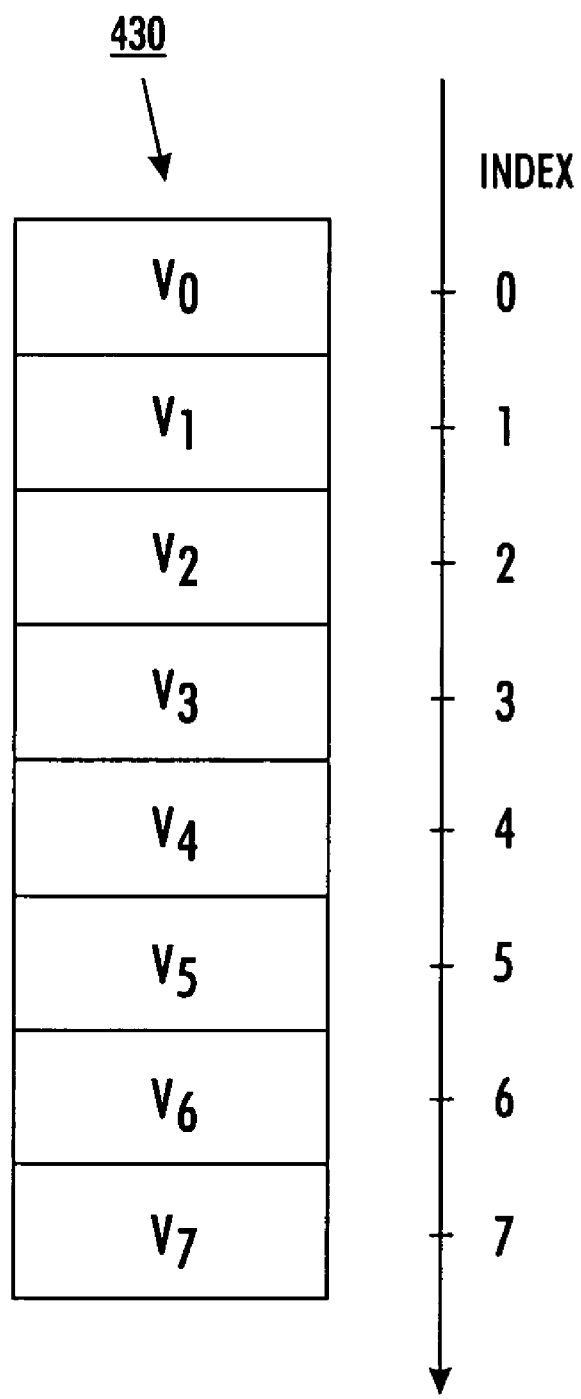
FIG. 15 illustrates another exemplary look-up table.

FIG. 15 illustrates a look-up table 430 having eight entries $V_i$, where i is an integer between 0 and 7. The locations of the values $V_i$ in the look-up table 430 are indicated by indices 0-7.

Figure 16:
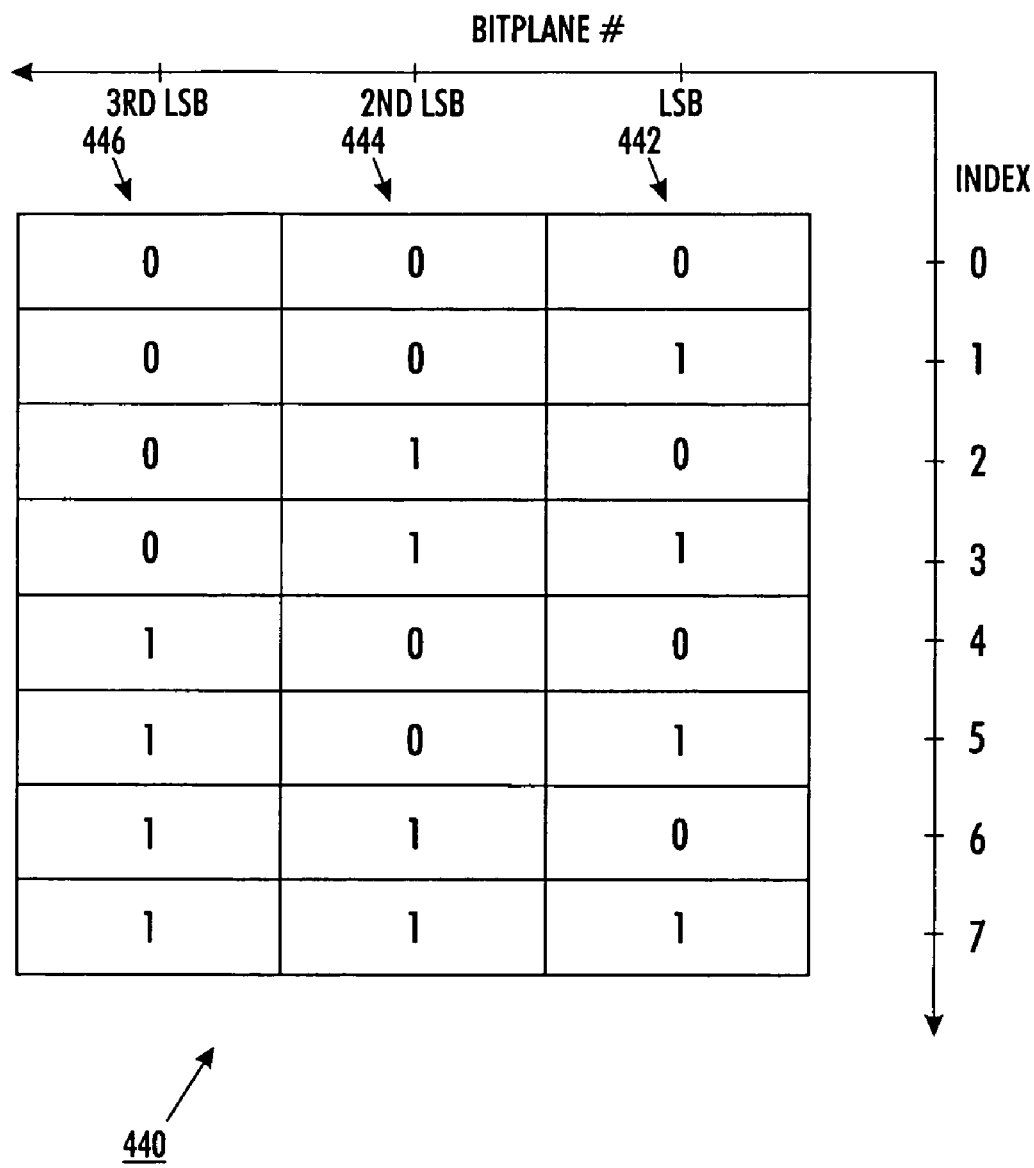
FIG. 16 illustrates the bit planes of the indices of the look-up table in FIG. 15.

The binary expressions of the indices are listed in table 440 of FIG. 16, with each row of table 440 corresponding to the binary expression of an index in a sequentially increasing order. As shown in FIG. 16, table 440 contains three bit planes, including the least significant bit plane 442, the second least significant bit plane 444 and the third least significant bit plane 446. The third least significant bit plane 446 corresponds to the most significant bit plane in this case.

Figure 17:
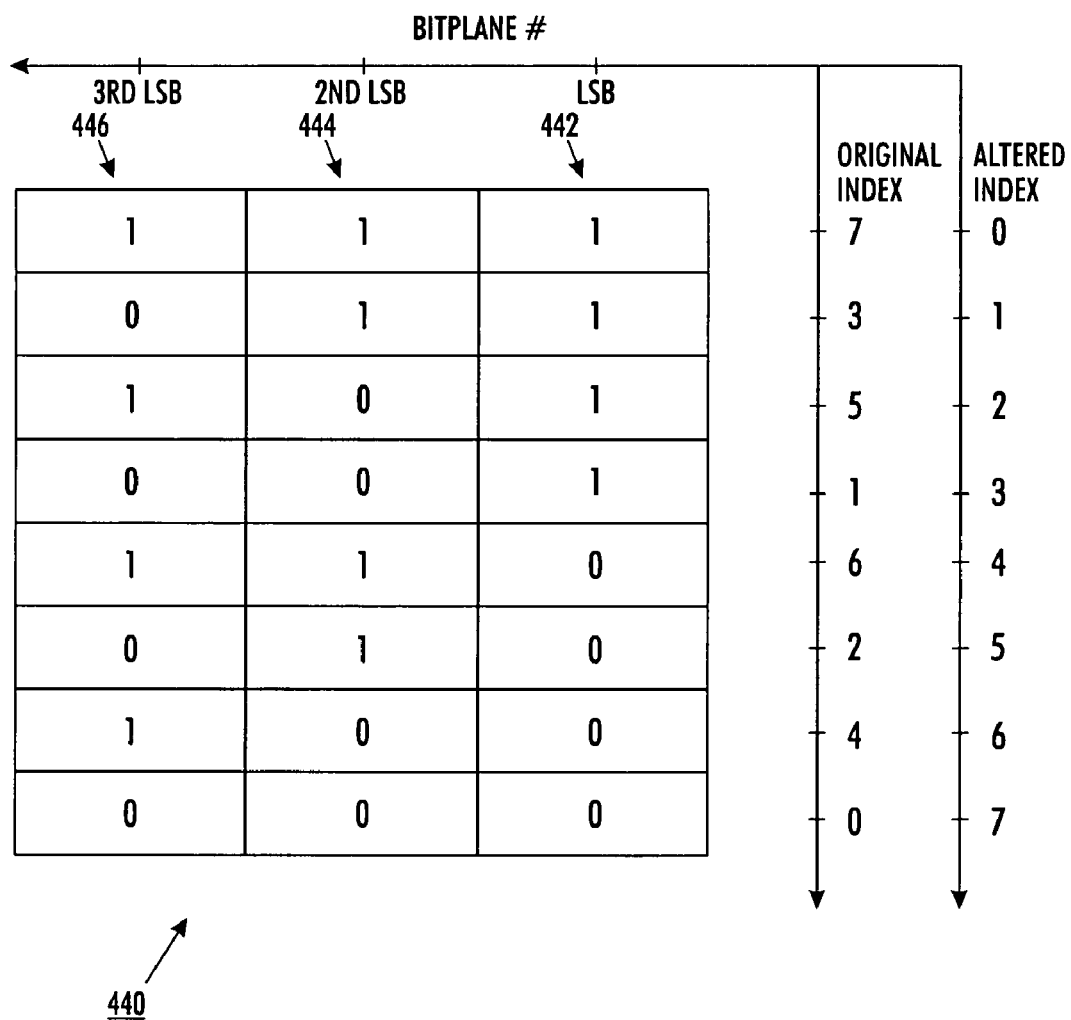
FIG. 17 illustrates an exemplary method of embedding a message in the look-up table of FIG. 15.

FIG. 17 illustrates a message-embedding process in the bit planes of table 440. The message is "111111111111," a 12-bit string with each bit being 1. As discussed above, the number of bits that may be embedded in each bit plane is four, which is half of eight, the number of indices. Thus, the first four ones of the message may be embedded in bit plane 442, the second four ones may be embedded in bit plane 444, and the last four ones may be embedded in bit plane 446.

As shown in FIG. 17, the first four ones are entered in the top four spaces in the bit plane 442, without violating any restrictions. Accordingly, four zeros are entered in the bottom four spaces of bit plane 442, because, out of the eight spaces in the bit plane 442, there may only be four ones. Thus, the remaining four spaces at the bottom of bit plane 442 must be filled with zeros.

The fifth and sixth ones are entered in the top two spaces in bit plane 444. However, the seventh and eighth ones may not be entered into the third and fourth spaces of the bit plane 444, because such entries would violate the restrictions discussed above. Thus, the seventh and eighth ones are entered in the fifth and sixth spaces of the bit plane 444, where the entries are permissible. Accordingly, the third, fourth, seventh and eighth spaces of the bit plane 444 are filled with zeros.

Based on the restrictions discussed above, the ninth through twelfth ones of the message may only be entered in the first, third, fifth and seventh spaces of bit plane 446, respectively. Accordingly, zeros are entered into the second, fourth, sixth and eighth spaces of bit plane 446. At this point, the message-embedding process is now completed.

Figure 18:
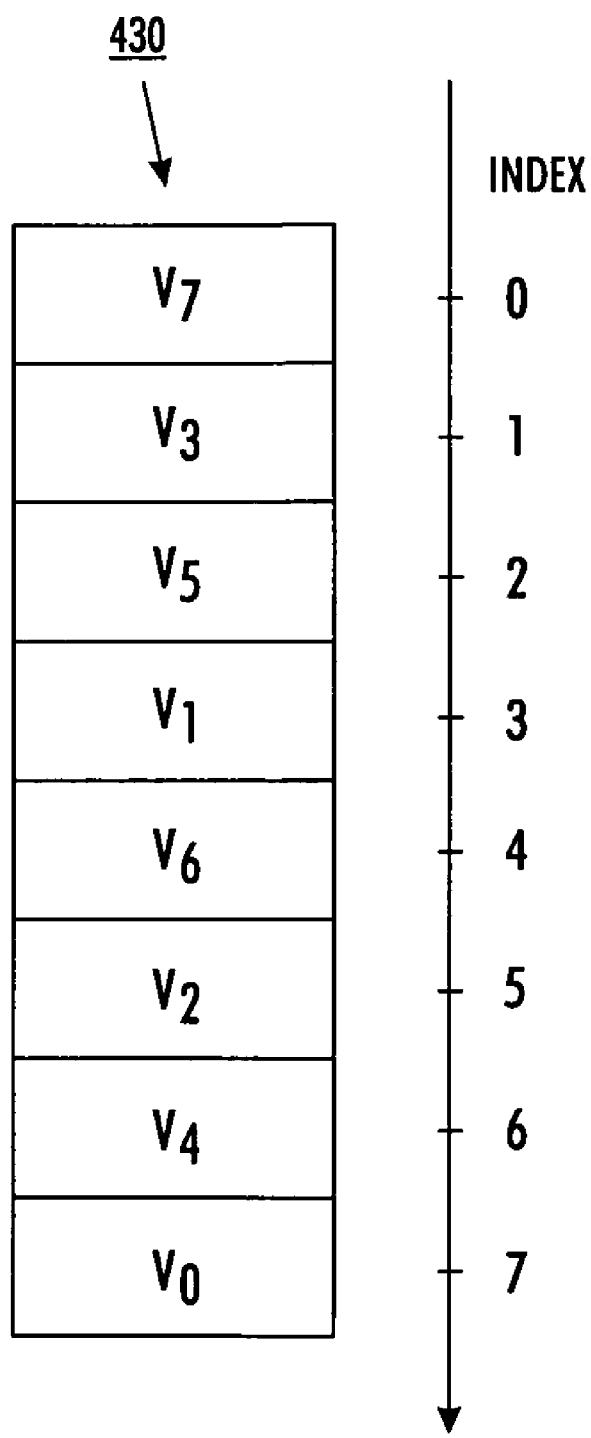
FIG. 18 illustrates the look-up table of FIG. 15 having altered indices.

As shown in FIG. 17, the message-embedding process rearranged the indices in an order "7, 3, 5, 1, 6, 2, 4, 0." When the original indices are altered or renamed according to the sequence of table 440 into a sequentially increasing order, the values $V_i$ are rearranged in look-up table 430. The locations or entries of the rearranged values in the look-up table are shown in FIG. 18.

As discussed in connection with FIG. 10, when a look-up table has four entries, the bit plane table 410 will have two bit planes. Each bit plane contains four bits. The number of bits in each bit plane available for message-embedding is two, half of four, which is the number of entries in the look-up table. The total number of bits in the message that can be embedded is four.

On the other hand, when the look-up table has eight entries, as discussed in connection with FIG. 17, the bit plane table 440 has three bit planes. Each bit plane contains eight bits. The number of bits in each bit plane available for image-embedding is four, half of eight which is the number of entries in the look-up table. The total number of bits in the message that can be embedded is 12.

Figure 19:
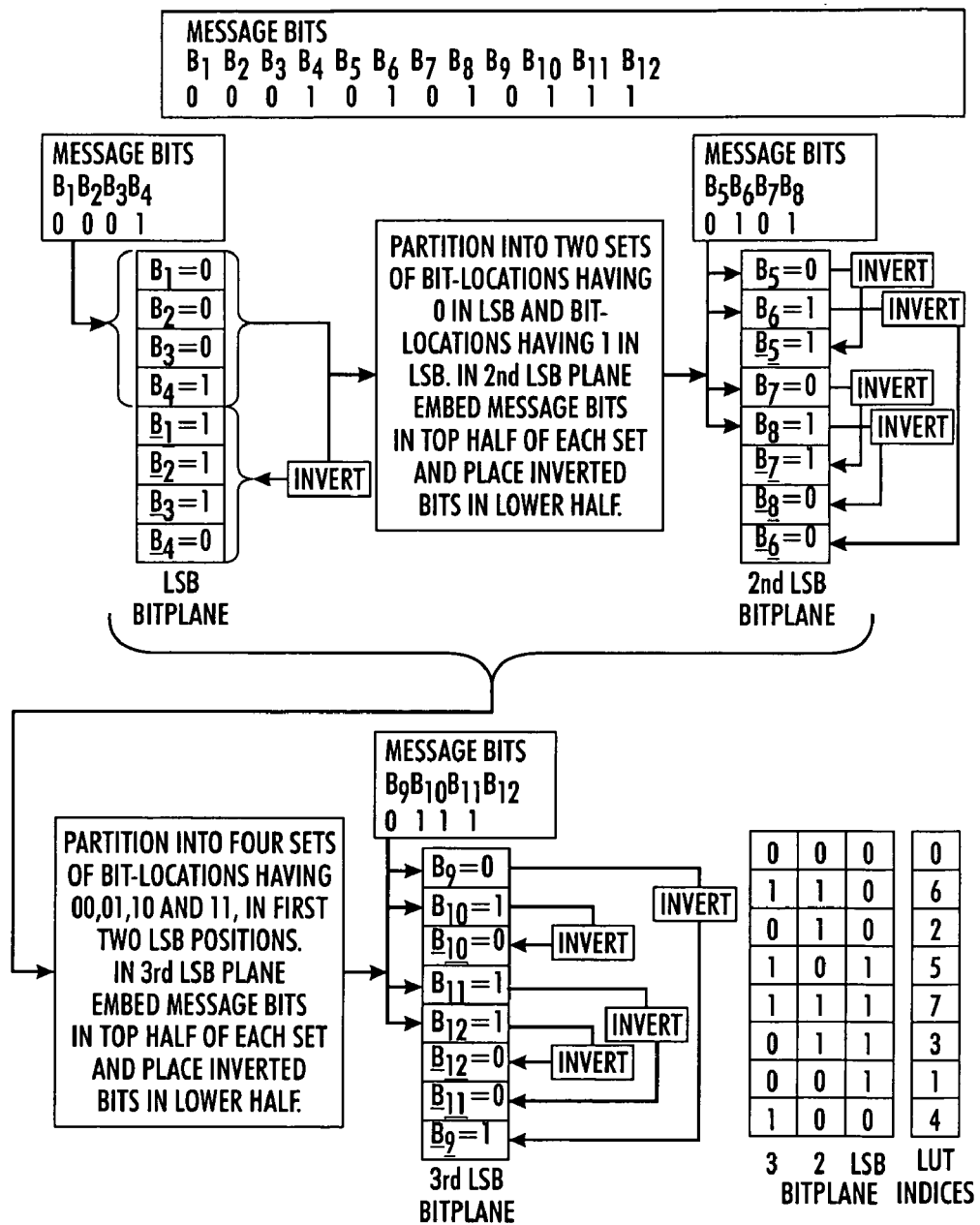
FIG. 19 illustrates an exemplary process for embedding message bit in bit planes of look up table (LUT) indices.

FIG. 19 illustrates an exemplary process for embedding message bit in bit planes of look up table (LUT) indices. As shown in FIG. 19, an exemplary process for embedding 12 message bits $B_1$, $B_2$, ... $B_{12}$ in a LUT with 8 entries is illustrated for the case when these bits take the values 0, 0, 0, 1, 0, 1, 0, 1, 0, 1, 1, 1, respectively. Bits $B_1$, $B_2$, $B_3$, $B_4$ are first placed in the top half of the LSB bit plane in sequence. The bottom half of the LSB bit plane is filled with the inverse of these bits $\overline{B_1}$, $\overline{B_2}$, $\overline{B_3}$, $\overline{B_4}$, in the same sequence. Assuming a standard 0/1 representation for bits the inverse $\overline{B}$ of a bit B is simply given by the mathematical relation $\overline{B}=(1-B)$. In each subsequent bit plane, the bit locations are partitioned into a number of sets such that in each set the values of the bits in all previous bit locations are identical. Within each set, the top half of the locations are used for inserting message bits and the inverses of corresponding bits are placed in the bottom half of the locations. The process is illustrated for the $2^{nd}$ and $3^{rd}$ LSB planes in FIG. 19, where bits $B_5$, $B_6$, $B_7$, $B_8$ are embedded in the $2^{nd}$ LSB plane and bits $\overline{B_9}$, $\overline{B_{10}}$, $\overline{B_{11}}$, $\overline{B_{12}}$ are embedded in the $3^{rd}$ LSB plane. As shown in FIG. 19, using this process may ensure that exactly half the bit values in a bit plane are zeros and the other half are ones also the binary expressions corresponding to the any two indices are distinct, i.e., the rows of bits in FIG. 19 are distinct. Finally, the bit planes may be combined and the binary representations can be interpreted as LUT indices.

Figure 20:
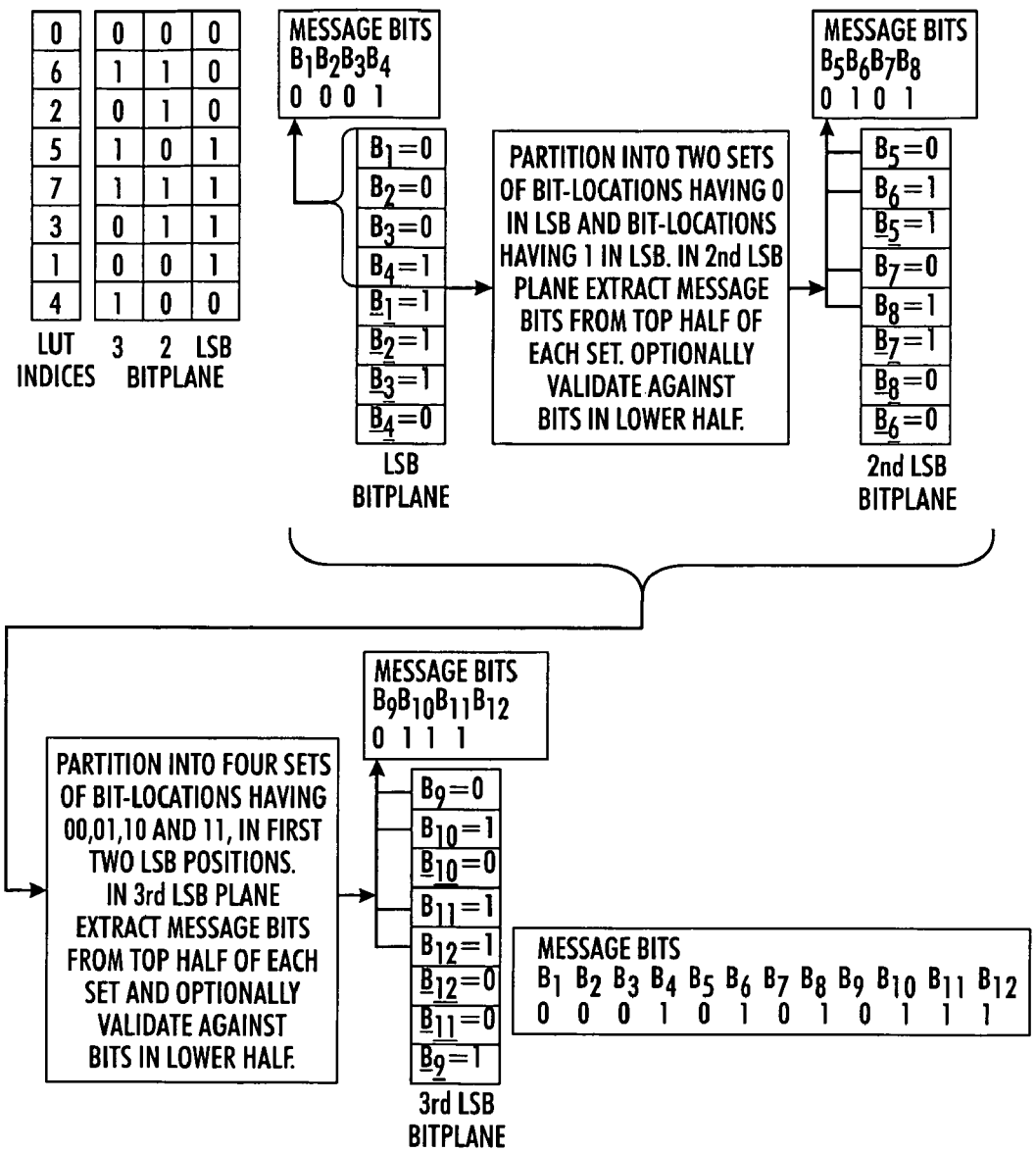
FIG. 20 illustrates an exemplary process for extracting message bit in bit planes of look up table (LUT) indices.

FIG. 20 illustrates an exemplary process for extracting message bit in bit planes of look up table (LUT) indices. As shown in FIG. 20, an exemplary process of extraction of the embedded bits may be the reverse of the process of embedding seen in FIG. 19 again with reference to a LUT with eight entries in which 12 message bits are embedded. First the LUT indices are converted into a binary representation and first LSB, second LSB, and third LSB bit planes are obtained. Next, the bits $\underline{B_1}$, $\underline{B_2}$, $\underline{B_3}$, $\underline{B_4}$ of the embedded message are read out as the top four bits of the LSB bit plane. In each subsequent bit plane, the bit locations are partitioned into a number of sets such that in each set the values of the bits in all previous bit locations are identical. Within each set, the bits in the top half of the locations are extracted as message bits. Optionally one may also partially check the validity of these bits by verifying that the bottom half locations for the set actually hold the corresponding inverses. The process is illustrated for the $2^{nd}$ and $3^{rd}$ LSB planes in FIG. 20, where bits $B_5$, $B_6$, $B_7$, $B_8$ are extracted from the $2^{nd}$ LSB plane and bits $\overline{B_9}$, $\overline{B_{10}}$, $\overline{B_{11}}$, $\overline{B_{12}}$ are extracted from the $3^{rd}$ LSB plane. As shown in FIG. 20, the extraction process reverses the embedding process and recovers the embedded message bits.

Based on the above description, the method may generalize to a look-up table of any size. The following describes an example in which the LUT size is a power of 2. For LUT sizes that are not powers of 2 may require a further modification such as using the nearest power of 2 or decomposition as a sum of powers of 2. In general, if the length the look-up table is N, there are $\log_2(N)$ bit planes, with each bit plane capable of storing N/2 bits. Thus, the total number of bits that can be embedded is $N/2*\log_2(N)$. This number is more than half of a theoretical limit of $\log_2(N!)$ bits. The embedding process begins with embedding N/2 bits by placing these in the top half of the LSB bit plane and their inverses in the bottom half. In each subsequent bit plane, the bit locations are partitioned into a number of sets such that in each set the values of the bits in all previous bit locations are identical. Within each set, the top half of the locations are used for inserting message bits and the inverses of corresponding bits are placed in the bottom half of the locations. Since the bits and their inverses have exactly N/2 zeros and N/2 ones, where N is the number of LUT entries, the process splits the set of locations having exactly the same values for the preceding bit planes into two halves and "prefixes" a one before the first half and a zero before the first half in the current bit plane. In general, for a LUT with N entries there are $\log_2(N)$ bit planes, at the kth LSB plane the table is split into $2^k$ sets each having $N/2^k$ entries. At the final stage, i.e., at the point of embedding in the $\log_2(N)$-th bit plane, there are two locations each for which all the previous $(\log_2(N)-1)$ bit planes are identical and the embedding process for the $\log_2(N)$-th plane pre-fixes a 1 and a 0 before these two locations, thereby making them distinct. The process thus assures that no two rows of bits are identical and the LUT indices represented by the binary values in the bit planes are actually a re-arrangement or permutation of the numbers 0 through (N-1).

The length of the message may be based on an industry standard, such as, for example, 4 bits or 8 bits. Alternatively, the length of the message may be dynamically indicated in the message. For example, a special character, such as the ASCII EOF (end of file) character, or string may be used to indicate the end of the message. When the number of bits available for embedding a message in the bit planes is greater than that of the message, the message may be embedded in the first available bits in the bit planes, leaving, for example, the last bit plane unused. Alternatively, the message may be embedded across all bit planes, but only occupying part of the available bits in each bit plane. A receiver may detect the embedded message as long as the receiver is aware of the way in which the message is embedded.

When the number of entries of a look-up table is not enough for a message, some entries of the look-up table may be replicated with different symbols assigned the same values, such as RGB values. The replication of the entries may enlarge the number of entries of the look-up table. However, it is not required that symbols be replicated. For example, alternatively, new unused values of RGB may be used to increase the capacity of the look-up table, since no pixel in the image points to those unused values.

In exemplary systems using electronic images with associated look-up tables, the indices of the look-up table entries may not be stored at all and may be implicit. For instance, in a palettized image, only a sequence of RGB triplets may be stored with the implicit assumption that the first triplet corresponds to index 0, the second to index 1, and so on till the final Nth triplet corresponds to index N-1, where N is the number of entries in the palette. The above method of embedding the information in the LUT indices may still be employed for such a system with a suitable modification. The embedder (and decoder) may agree on a "natural ordering" of RGB entries based on their values alone (or based on, for example, the first occurrence of the entries in the image). Note that the method assumes that RGB triplets are distinct, a constraint that is easily met, as discussed above. Any ordering of the entire possible range of RGB values that maps distinct RGB values to distinct numerical values may be utilized for this purpose. For instance, in the case of 8 bit RGB values, one such ordering is in the increasing order of the value (R+256*G+256*256*B) for each of the entries. In general, the bits representing RGB values may be permuted in any fashion and concatenated together producing a new number which may be sorted to represent the ordering. The receiver may then determine the permutation required to re-arrange set of RGB palette entries from the embedded sequence to the "natural ordering" and extract the information from this embedding (instead of requiring the LUT indices in the image).

In an exemplary implementation, the encoder may first embed messages in the LUT indices as indicated in the preceding description. FIG. 21 illustrates an exemplary look up table (LUT) with a message embedded in look up table (LUT) indices including a column of LUT indices carrying embedded information and corresponding LUT entries that carry information for reconstructing an RGB image. The LUT thus generated is a tabular list with two columns and N rows, as shown in FIG. 21. For each row, the first column contains an index of the LUT and the second column carries the RGB triplet values corresponding to the index in the first column. The associated image (not shown) contains at each pixel a LUT index that encodes for the RGB triplet corresponding to the entry in the LUT. Note that with this representation, two types of transformations may be made to the LUT without changing any of the intrinsic image pixel values (i.e., the RGB values associated with each pixel location): 1) rows in the LUT may be re-ordered, and 2) Any permutation (re-ordering) may be applied to both the indices in the LUT and in the image.

Figure 22:
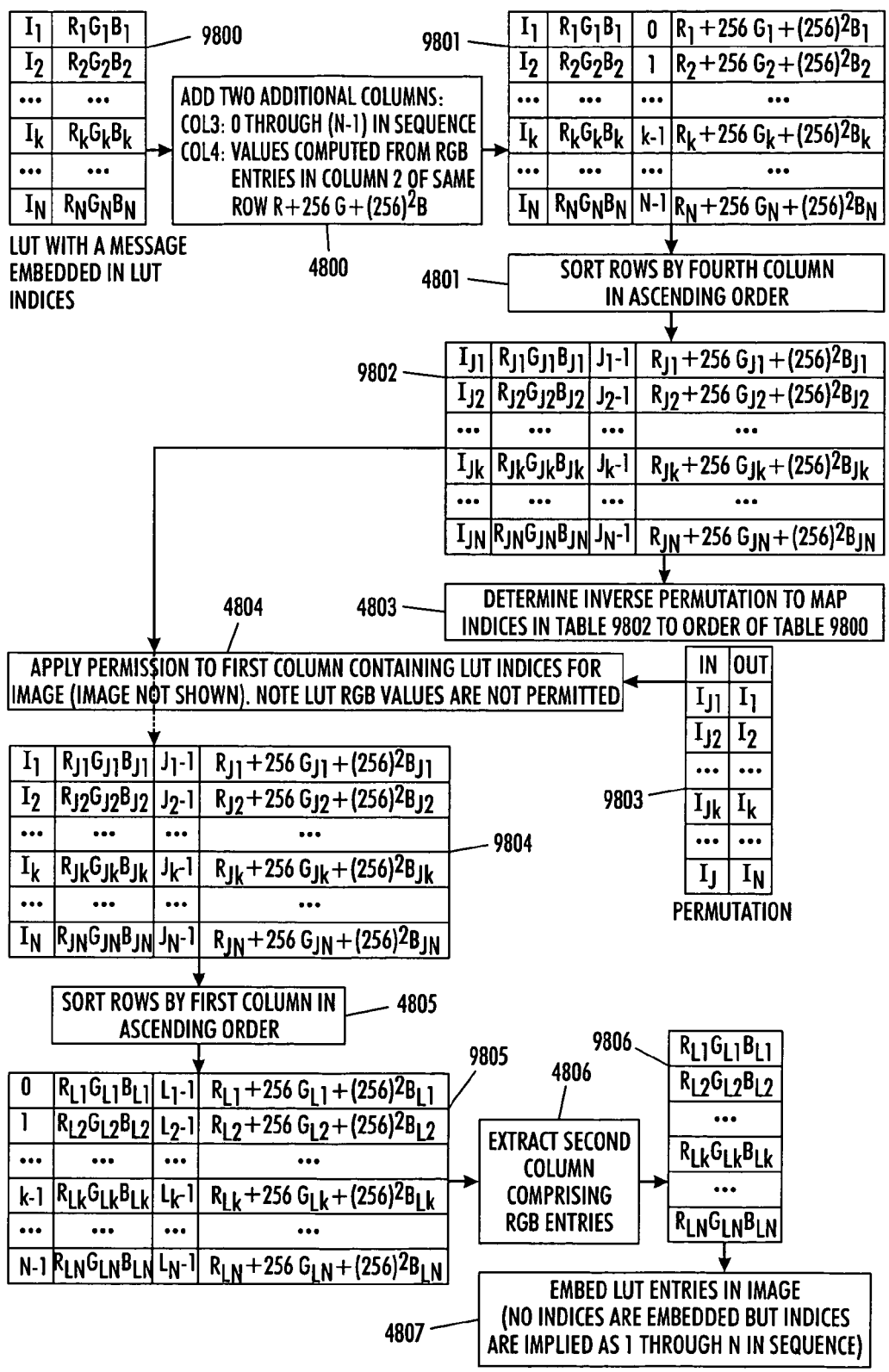
FIG. 22 illustrates an exemplary process for re-ordering LUT entries at embedder for generating a LUT stored without indices.

FIG. 22 illustrates the process for obtaining a LUT with implicit indices from the LUT of FIG. 21. The implicit indices are 0 through (N-1) in sequence. The process consists of two steps, each a transformation that is in one of the two classes described above: Step 1) map both the LUT indices and the indices in the image through the inverse of the permutation that orders the RGB values in increasing order of (R+256*G+256*256*B), and 2) re-order rows in LUT in increasing order of LUT indices.

With reference to FIG. 22, a detailed implementation may be seen. The LUT labeled 9800 is the LUT obtained from the embedding process described earlier. In the first step 4800 two columns are added to the tabular list of the LUT producing a tabular list 9801 with four columns: Column 1 having LUT indices (with embedded message), Column 2 containing corresponding RGB values, Column 3 containing the numbers 0 through (N-1) in ascending order and Column 4 having its kth row entry $(R_k+256*G_k+256*256*B_k)$, where $R_kG_kB_k$ is the triplet of RGB values in the second column of the kth row. Column 2 is for the purpose of clearly illustrating the effect of each step and is not required otherwise. Step 1 of the embedding process can be accomplished by a three sub-step sequence: a) In step 4801, the rows of the newly created table 9801 are sorted in ascending order of the fourth column to obtain a new tabular list 9802, b) next in step 4803, the inverse permutation 9803 is formed by mapping the LUT indices from the re-ordered table 9802 to the original order of 9800, c). Next, in step 4804, the inverse permutation of 9803 is applied to both the indices in the LUT 9802 and to the indices representing image pixel values, the resulting tabular list from this operation is shown in 9804. The same permutation may equivalently be applied to the indices of the LUT in 9800, however, for clarity of presentation we assume that the LUT of 9802 is used.

The second step of the embedding process is then shown as 4805, where the rows of the tabular list of 9804 are sorting in ascending order of the LUT indices in column 1 to obtain the tabular list 9805. In 9805, the LUT indices are the numbers 0 through (N-1) in sequence and may therefore be omitted from the embedded LUT entirely. In step 4806, the second column of the tabular list of 9805 is extracted to form the LUT 9806 with implicit indices that is embedded in the image in step 4807, producing an image with an implicit LUT with the message embedded within the LUT.

Figure 23:
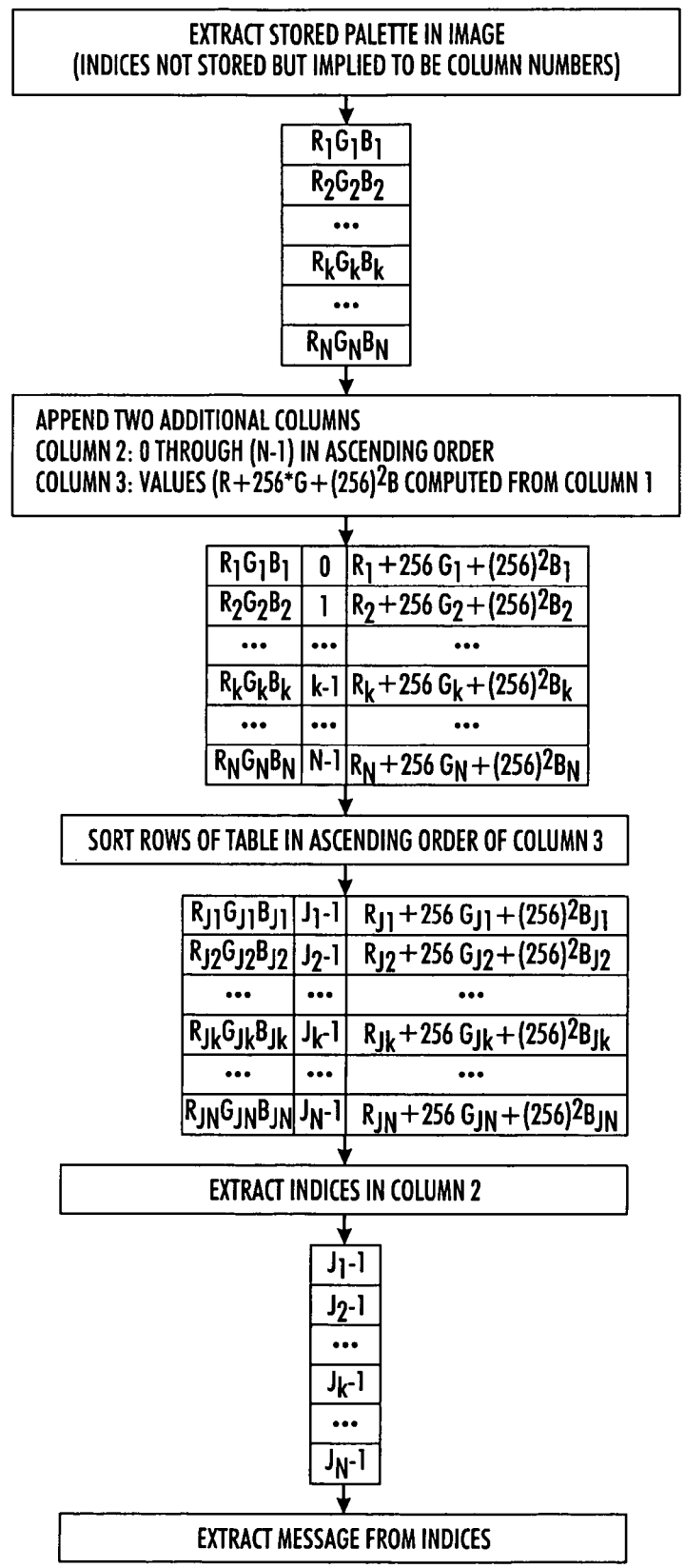
FIG. 23 illustrates an exemplary process for extracting message from embedded palette where palette indices are not stored with the palette.

The process of extraction of the message embedded in an image having a LUT with implicit LUT indices is illustrated in FIG. 23. In the first step, the sequence of LUT RGB values is extracted from the image LUT (which has no indices). Next two columns are added to this tabular list producing a new tabular list with three columns: column 1 having the RGB entries in the LUT, column 2 having the implicit LUT indices as the sequence of numbers 0 through (N-1), and column 3 having its kth row entry $(R_k+256*G_k+256*256*B_k)$, where $R_kG_kB_k$ is the triplet of RGB values in the second column of the kth row. The rows of the resulting tabular list are then sorted in ascending order of the entries in the third column. The corresponding column of indices is then extracted and the embedded message is extracted from these indices. Note that if the image is unaltered since the embedding process of FIG. 22, the step of re-ordering reverses the step 4805 of FIG. 22 and the indices recovered in FIG. 23 are the same as the indices in the first column of 9804 (or 9800) or the and therefore the extracted message is identical to the embedded message.

The above-discussed message, that is to be embedded in a look-up table, may be generated based on a characteristic of the image, such as a CRC (cyclic redundancy check) or hash function of the image. For example, the hash function of the image may be computed using the method introduced in "The MD5 Message Digest Algorithm," by R. L. Rivest, *Internet RFC*, 1321, April 1992. The MD5 message digest algorithm takes a binary message of arbitrary length and produces a 128-bit "fingerprint" or "message digest" of the message. While both a CRC or an MD5 message digest provide the capability to detect modifications in the message, their capabilities and therefore the purposes for which they may be employed differ. Based on the CRC code selected, the CRC offers a guarantee of detecting specific changes (for example, up to a certain number of random changes or changes occurring in bursts of specific lengths). The MD5 message digest offers the property that creating a different message with the same message digest is computationally difficult using current knowledge. This property has the cryptographic advantage that in spite of knowing the message digest an adversary would considerable difficulty in creating a different message which has the same message digest. Thus the message digest or fingerprint is bound to the message for which it is computed and it is not easy to forge another message for which the fingerprint is the same (this property does not hold for conventional CRCs). In the following discussion we assume that the image characteristic consists of a MD5 message digest. It is understood that the characteristic could alternately be a CRC or another known or later developed cryptographic hash function (for example, one generated using the secure hash algorithm as described in "Applied Cryptography", by Bruce Schneier, $2^{nd}$ Edition, John Wiley, 1996, pp. 442-445).

The characteristic of the image may be encrypted with, for example, a private key of an encryption system to generate a message authentication code (MAC) for the image. Once again, a MAC based on the combination of MD-5 algorithm and encryption is chosen for the purpose of illustration here and any general message authentication code (MAC) may be used in this process. Details of MACs may be found in standard Cryptography texts/handbooks such as "Applied Cryptography", by Bruce Schneier, $2^{nd}$ Edition, John Wiley, 1996, pages 455-459. This MAC may be used as the message that is to be embedded. Alternatively, the MAC may be combined with additional information, and the combination of the MAC and the additional information may be used as the message to be embedded. Alternatively, a one-to-one transformation of the hash function, instead of the hash function itself, may be used for encryption to generate the MAC for subsequently generating the message to be embedded. The encryption system may be a private key cryptosystem or a public key system.

The message may be subsequently embedded in the look-up table associated with the image. A receiver, after receiving the image and the look-up table, may determine the characteristic from the image. At the same time, the receiver may extract the message from the look-up table, and decrypt the encrypted characteristic of the image by using a key of the encryption system. A publicly available "public key" out of the private-public key pair would be utilized in a public key based cryptosystem and a (secret) private key would be utilized in a private key cryptosystem. The receiver may subsequently compare the determined characteristic and the decrypted characteristic of the image. The two characteristics should agree if the image is from a trusted source. If the two characteristics do not agree, the image is likely to be from an untrusted source, or to have been altered.

Figure 24:
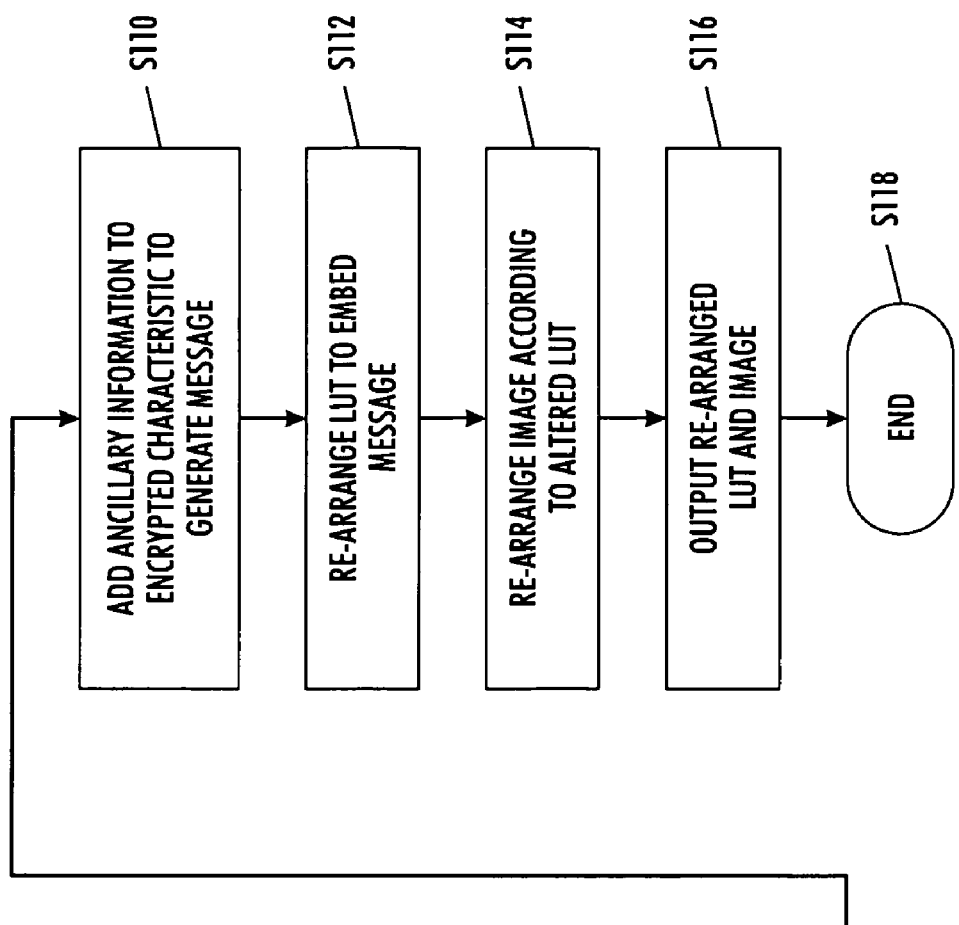
FIG. 24 outlines an exemplary process of embedding a message in a look-up table.
Figure 24:
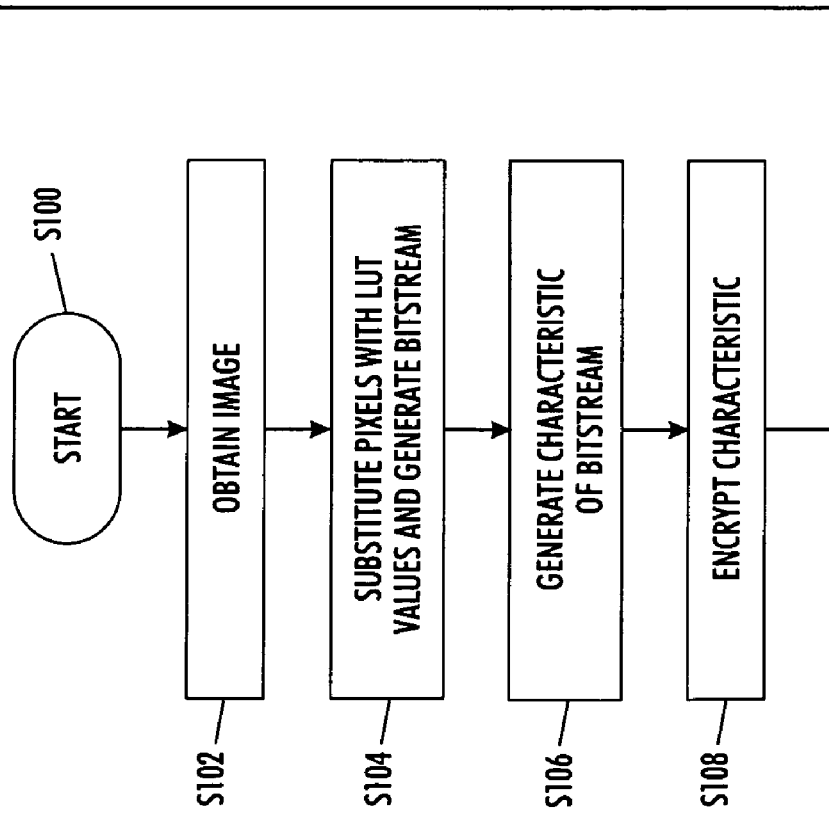

FIG. 24 illustrates a method for embedding a message generated from the characteristic of an image. As shown in FIG. 24, starting from step S100, process of the method proceeds to step S102, where an image is obtained. Next, in step S104, the pixels of the image are substituted with corresponding look-up table values to generate a bit stream. The bit stream is generated by scanning the bits of the pixels in a predefined order. Process of the method then proceeds to step S106.

In step S106, a characteristic of the image is generated from the bit stream. The characteristic may be a cryptographic hash function of the image. Then, in step S103, the characteristic is encrypted with, for example, a private key of an encryption system to generate, for example, a message authentication code (MAC). As indicated earlier, alternate cryptographic techniques for generating a MAC or a digital signature may also be used in this process.

Next, in step S110, a message is generated from the encrypted characteristic and, if any, ancillary information. The ancillary information may include copyright information, name and/or address of a corporation, version of the image, etc. Then, the look-up table is rearranged to embed the message. The message may be embedded in the bit planes of the indices of the values of the look-up table. Process of the method then proceeds to step S114.

In step S114, the image is rearranged according to the altered look-up table. In particular, the pixels of the image are associated with different indices, if necessary, so as to be associated with the original values in the look-up table. Next, in step S116, the rearranged image and look-up table are output. Thereafter, process of the method proceeds to step S118, where the method ends.

Figure 25:
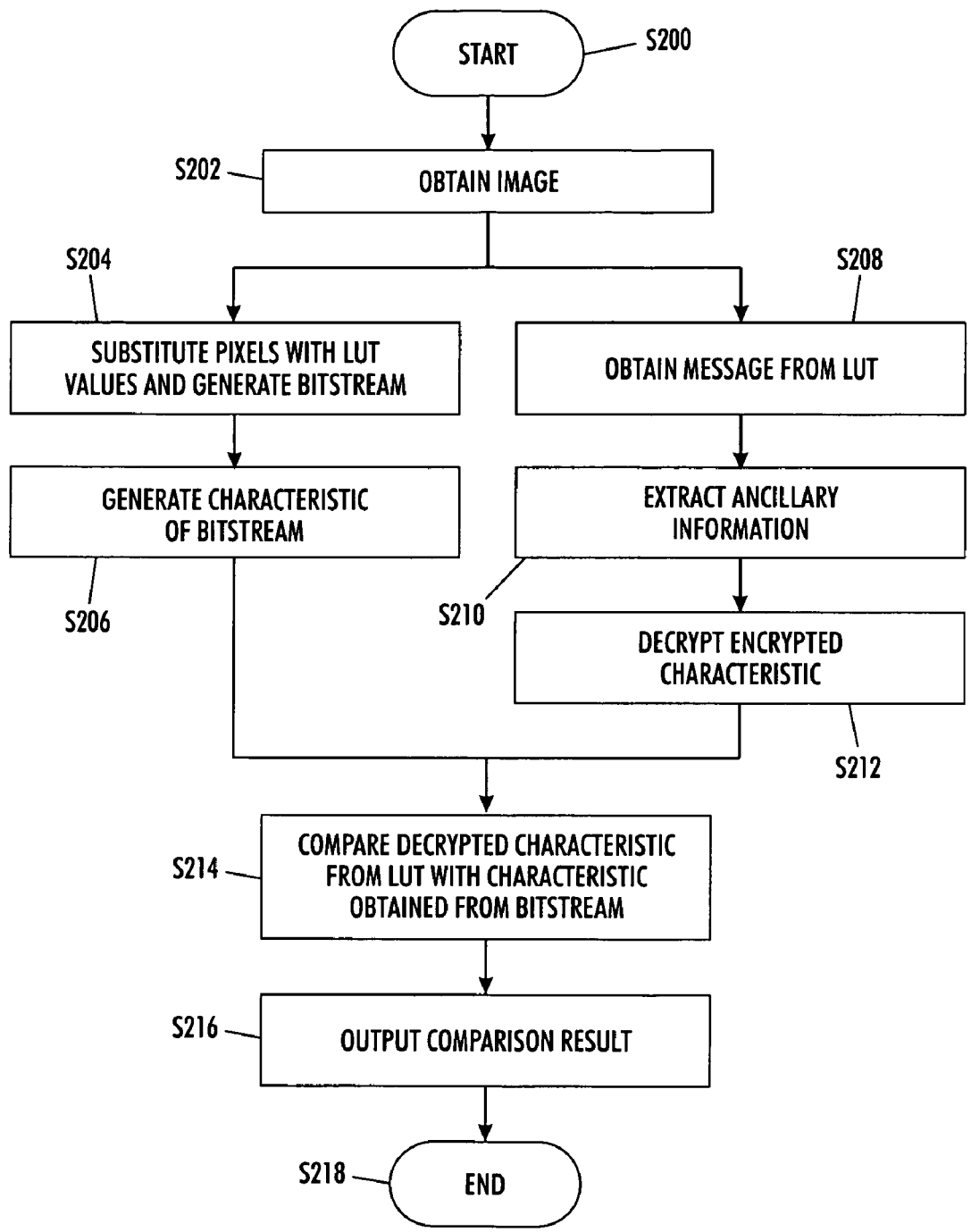
FIG. 25 outlines an exemplary process of verifying a message authentication code (MAC)

FIG. 25 is a flowchart outlining an exemplary method for detecting and verifying a message authentication code (MAC) embedded in a look-up table accompanying an image. As shown in FIG. 25, beginning in step S200, process of the method proceeds to step S202 in which an image is obtained. Next, process of the method proceeds in two branches. The first branch includes step S204 and S206, while the second branch includes step S208, S210 and S212. Although depicted in two separate branches, steps S204 and S206 do not necessarily need to be performed in parallel with steps S208, S210 and S212. It will be appreciated that the collective purpose of steps S204-S212 is to obtain the values that will be compared in step S214, and that these values may be obtained simultaneously or in any order.

In the first branch, at step S204, the pixels of the image are substituted with look-up table values to generate a bit stream. The bit stream is generated by scanning the bits of the pixels in a predefined order, such as the same order in which the bits are scanned for generating the bit stream in step S106 of FIG. 24. Next, in step S206, a characteristic of the image is generated from the bit stream. The characteristic may be a CRC or hash function of the image.

In the second branch, a message is obtained from the look-up table at step S208. The method for obtaining the message from the look-up table may be the "reverse" method discussed in connection with FIG. 10. Next, in step S210, the message is analyzed to extract data presumed to be the MAC. The message may be the presumed MAC itself, in which case the extraction of the message accomplishes the extraction of the presumed MAC. Alternatively, as discussed above, the message may be a combination of a MAC data and additional, ancillary information. Under such circumstances, the ancillary information is separated in the message to extract the presumed MAC. Thereafter, in step S212, the presumed MAC is decrypted to obtain a presumed characteristic of the image. The decryption may use a public key of the encryption system by which the characteristic was encrypted. For example, the public may be the other half of a key pair, the private key of which was used in encrypting the characteristic.

As shown in FIG. 25, the two branches combine at step S214, where the decrypted presumed characteristic from the look-up table and the characteristic generated from the bit stream are compared. Next, in step S216, the result of the comparison is output. If the two characteristics agree with each other, it may be determined that the image is from a trusted source. On the other hand, if the characteristics do not agree, authentication of the image fails. Thereafter, process of the method proceeds to step S218, where the method ends.

The methods illustrated in FIGS. 24 and 25 may be implemented in a computer program product that can be executed on a computer. The computer program product may be a computer-readable recording medium on which a control program is recorded, or it may be a transmittable carrier wave in which the control program is embodied as a data signal.

Figure 26:
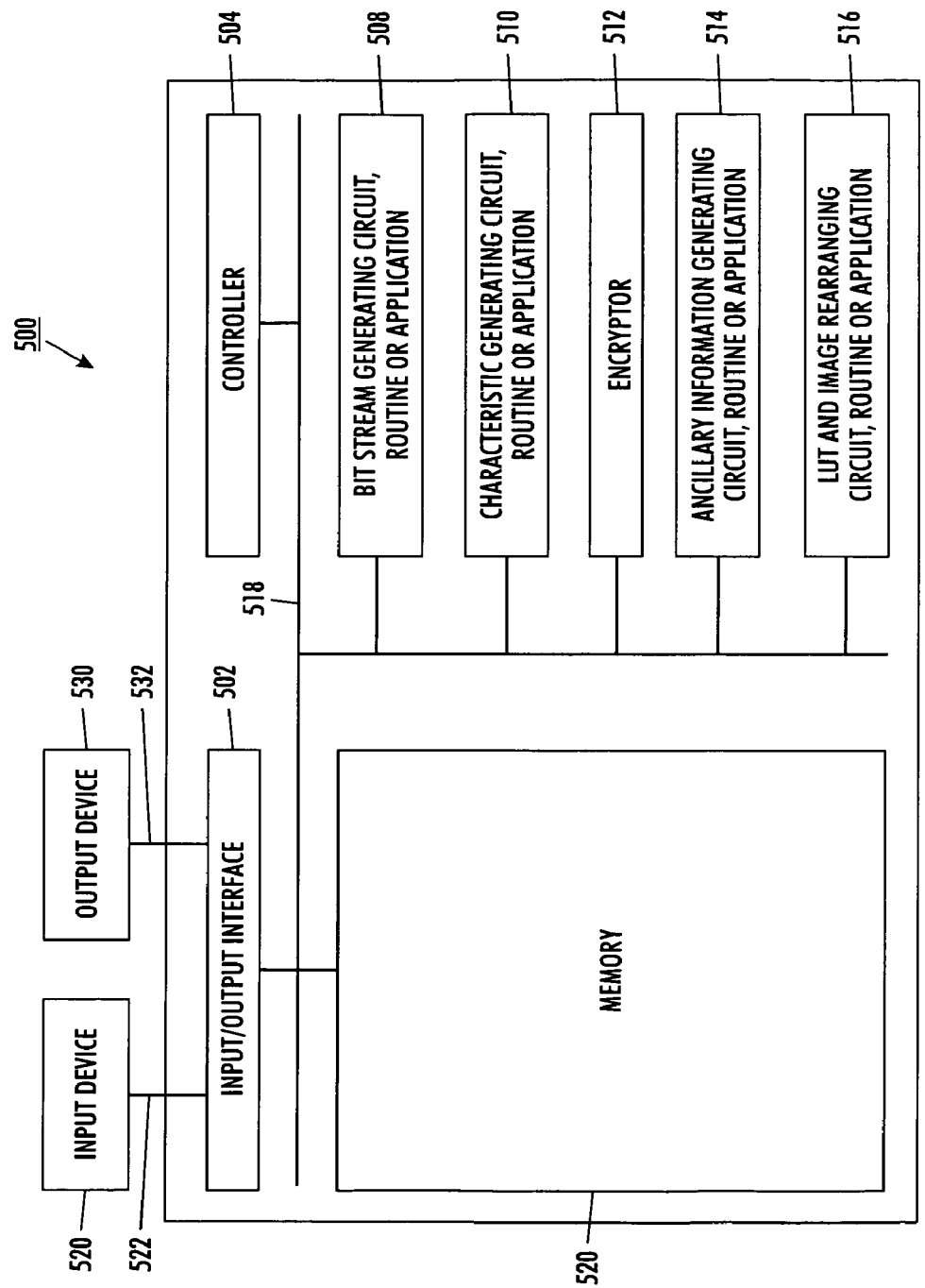
FIG. 26 illustrates an exemplary system for embedding a message in a look-up table.

FIG. 26 is a function block diagram of an exemplary system for embedding a message. As shown in FIG. 26, the system 500 includes an input/output interface 502, a controller 504, a memory 506, a bit stream generating circuit, routine or application 508, a characteristic generating circuit, routine or application 510, an encryptor 512, an ancillary information generating circuit, routine or application 514 and a look-up table and image rearranging circuit, routine or application 516, interconnected by one or more control and/or data buses and/or application programming interfaces 518. The input/output interface 502 interacts with an input device 520 and an output device 530. The input device 520 and the output device 530 are connected to the system 500 via links 522 and 532, respectively.

In operation, under control of the controller 504, the input/output interface 502 receives an image and associated look-up table from input device 520. The bit stream generating circuit, routine or application 508 replaces the pixels in the image with their corresponding look-up table values to generate a bit stream by scanning the bits of the pixels in a predefined order. In the predefined order, the image may be scanned, for example, horizontally from left to right, progressing vertically from top to bottom. It will be appreciated that the scanning may take any order. The predefined order may be stored in the memory 506, or may be implemented by a program stored in the memory 506.

The characteristic generating circuit, routine or application 510 generates a characteristic of the bit stream, such as a CRC or hash function of the image. The encryptor 512 encrypts the characteristic by using, for example, a private key of an encryption system. The private key may be in pair with a public key. The public key may be used in decrypting the characteristic. The encryption may be used as a message authentication code (MAC).

The ancillary information generating circuit, routine or application 514 generates a message based on the encrypted characteristic and by adding ancillary information, if any. For example, the message may be generated as a combination of a MAC and ancillary information. The look-up table and image rearranging circuit, routine or application 516 rearranges the look-up table to embed the message, and rearranges the pixels of the image based on the rearranged look-up table. Embedding the message may automatically embed the MAC. The input/output interface 502 outputs the rearranged image and look-up table via output device 530.

During operation of the system 500, the memory may 506 store data produced by the input/output interface 502, the bit stream generating circuit, routine or application 508, the characteristic generating circuit, routine or application 510, the encryptor 512, the ancillary information generating circuit, routine or application 514, and/or the look-up table and image rearranging circuit, routine or application 516. The memory 506 may also store any program needed to perform the processing. Although depicted as a single entity, the memory 506 may be distributed as a plurality of entities.

Figure 27:
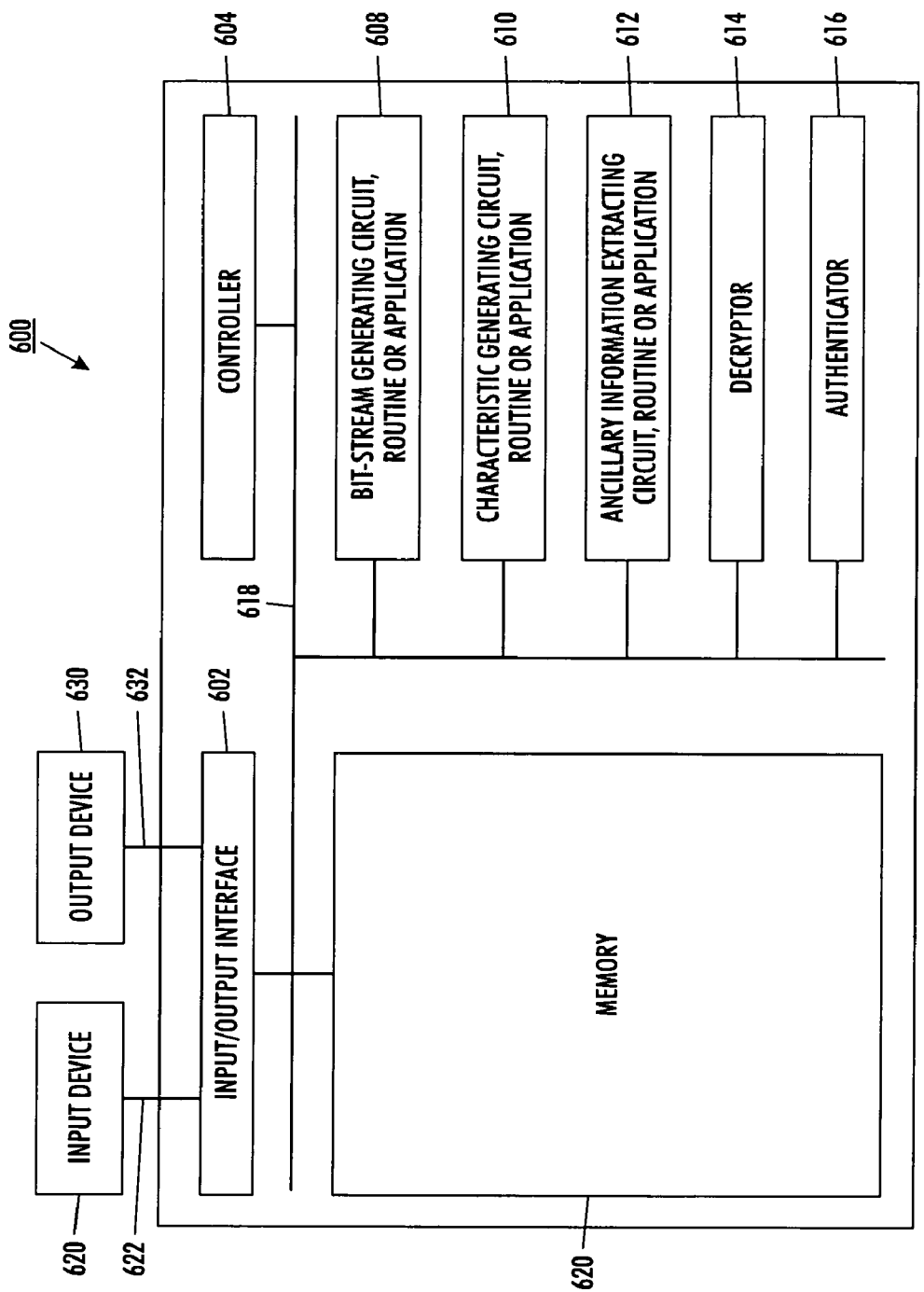
FIG. 27 illustrates an exemplary system for verifying a message authentication code (MAC).

FIG. 27 is a functional block diagram of an exemplary system for detecting and verifying a MAC. As shown in FIG. 27, the system 600 includes an input/output interface 602, a controller 604, a memory 606, a bit stream generating circuit, routine or application 608, a characteristic generating circuit, routine or application 610, an ancillary information extracting circuit, routine or application 612, a decryptor 614 and an authenticator 616, each interconnected by one or more control and/or data buses and/or application programming interfaces 618.

The input/output interface 602 interfaces with an input device 620 and an output device 630. The input device 620 and the output device 630 are connected to the system 600 via links 622 and 632, respectively. The memory 606 stores data made available by the input/output interface 602, the bit stream generating circuit, routine or application 608, the characteristic generating circuit, routine or application 16, the ancillary information extracting circuit, routine or application 612, the decryptor 614 and/or the authenticator 616.

In operation, under the control of controller 604, the input/output interface 602 receives an image and a look-up table. The look-up table may contain a MAC. The bit stream generating circuit, routine or application 608 substitutes the pixels of the image by their corresponding look-up table values to generate a bit stream. The bit stream may be generated by scanning the bits of the pixels in a predetermined order, such as the order in which the bits were scanned in a process in which the MAC was embedded.

The characteristic generating circuit, routine or application 610 obtains a characteristic from the bit stream, such as a CRC or hash function. The ancillary information extracting circuit, routine or application 612 obtains a message from the look-up table, extracts ancillary information, if any, from the message and separates the presumed MAC from the ancillary information. The decryptor 614 decrypts the presumed MAC to obtain a characteristic that was presumably encrypted in the MAC. The authenticator 616 compares the decrypted characteristic from the look-up table and the characteristic obtained from the bit stream, and indicates a success or failure based on whether the two characteristics agree or disagree, respectively. The input/output interface 602 outputs the indication via the output device 630.

The indication may take one or more of a variety of forms. For example, in an application to verify whether an online token used as "online currency" is authentic, the indication may be a written message or voice message, such as, for example, "token authentic" if the comparison is successful. The indication may be an alarm sound or written message if the comparison is a failure. Alternatively, the indication may be in the form of red or green light, a display of a symbol (e.g., a "√" if authentic or an "X" if not authentic), or the like.

During operation of the system 600, the memory may 606 store data produced by the input/output interface 602, the bit stream generating circuit, routine or application 608, the characteristic generating circuit, routine or application 610, the ancillary information extracting circuit, routine or application 612, the decryptor 614 and the authenticator 616. The memory 606 may also store any program needed to perform the processing. Although depicted as a single entity, the memory 606 may be distributed as a plurality of entities.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A computer-readable storage medium storing computer-executable instructions for executing a method of embedding a message in a look-up table (LUT) for a data set, the LUT including a plurality of entries for a plurality of values, each of the plurality of values providing information regarding the data set, each of the plurality of entries capable of being used for one of the plurality of values, the plurality of values capable of being arranged in the entries of the LUT in a plurality of arrangements, wherein the plurality of entries is associated with a set of N indices, N being an integer, the method comprising:

obtaining a message, the message providing information other than the information regarding the data set;

selecting an arrangement from the plurality of arrangements based on the message;

arranging the plurality of values in the LUT based on the selected arrangement; and embedding first M bits of the message in first M spaces of a least significant bit (LSB) plane of the set of N indices, wherein M is an integer equal to or less than N/2 and M is at least 2.

2. The method of claim 1, wherein the image is a palettized image, the LUT is a color code table, and the values are RGB values.

3. The method of claim 1, wherein entries of the LUT are arranged in an increasing order based on the RGB values according to: R+256*G+256*256*B.

4. The method of claim 1, further comprising:
embedding first L1 bits of remaining bits of the message in first L1 spaces of a second least significant bit plane of the N indices, wherein L1 is an integer equal to or less than M/2.

5. The method of claim 4, wherein M=N/2, L1=M/2, the method further comprising:
embedding invert values of the first L1 bits in spaces L1+1 to M of the second least significant bit plane, an invert value of a bit A being (1-A); and
embedding second L1 bits of the remaining bits of the message in spaces M+1 to M+L1+1 of the second least significant bit plane.

6. The method of claim 4, further comprising:
embedding subsequent L1 bits of remaining bits of the message in L1 subsequent available indices of the second least significant bit plane, the available indices being restricted by binary expressions of the N indices.

7. The method of claim 1, further comprising:
embedding a message having a length of (N/2)*log2(N) bits.

8. The method of claim 1, wherein, when the message has a length of N1 bits, N1 being an integer great than N, the method comprises:
replicating values of the LUT; and
adding N2 indices to the set of indices, the added N2 indices indicating positions of the replicated in the LUT, wherein N2 is an integer equal to or greater than N1-N.

9. The method of claim 1, the data set being an image, the image having pixels, each pixel being associated with one of the plurality of values via one of a set of indices, each index indicating a position of the associated value in the LUT, the method further comprising:
reconstructing the image by replacing the indices at the pixels with the respective associated values;
converting the reconstructed image into a bit stream representation by scanning bits of the pixels in a predefined order;
determining a characteristic of the image from the bit stream representation;
encrypting the characteristic using a private key; and
generating the message based on the encrypted characteristic.

10. The method of claim 9, wherein the characteristic is a CRC or hash function of the bit stream representation.

11. The method of claim 9, further comprising:
transforming the characteristic into a transformed function; and
encrypting the transformed function with the private key.

12. The method of claim 9, further comprising:
obtaining a message authentication code (MAC) based on the encrypted characteristic; and
generating the message based on the message authentication code (MAC).

13. The method of claim 1, the data set being an image, the image having pixels, each pixel being associated with one of the plurality of values via one of a set of indices, each index indicating a position of the associated value in the LUT, the method further comprising:
determining an order of the set of indices in the LUT; and
altering the determined order into an altered order.

14. A system of embedding a message in a look-up table (LUT) for a data set, the LUT including a plurality of entries for a plurality of values, each of the plurality of values providing information regarding the data set, each of the plurality of entries capable of being used for one of the plurality of values, the plurality of entries is associated with a set of N indices, N being an integer, the plurality of values capable of being arranged in the entries of the LUT in a plurality of arrangements, the system comprising:
a controller, wherein the controller obtains a message, the message providing information other than the information regarding the data set; and
a LUT and image rearrangement circuit, routine or application that selects an arrangement from the plurality of arrangements based on the message, and arranges the plurality of values in the LUT based on the selected arrangement,
wherein the controller controls the LUT and image rearrangement circuit, routine or application to:
embed first M bits of the message in first M spaces of a least significant bit (LSB) plane of the set of N indices, wherein M is an integer equal to or less than N/2 and M is at least 2.

15. The system of claim 14, wherein the image is a palettized image, the LUT is a color code table, and the values are RGB values.

16. The system of claim 15, wherein entries of the LUT are arranged in an increasing order based on the RGB values according to: R+256*G+256*256*B.

17. The system of claim 14, the controller further controlling the LUT and image rearrangement circuit, routine or application to:
embed first L1 bits of remaining bits of the message in first L1 spaces of a second least significant bit plane of the N indices, wherein L1 is an integer equal to or less than M/2.

18. The system of claim 17, wherein M=N/2, L1=M/2, the controller further controlling the LUT and image rearrangement circuit, routine or application to:
embed invert values of the first L1 bits in spaces L1+1 to M of the second least significant bit plane, an invert value of a bit A being (1-A); and
embed second L1 bits of the remaining bits of the message in spaces M+1 to M+L1+1 of the second least significant bit plane.

19. The system of claim 17, the controller further controlling the LUT and image rearrangement circuit, routine or application to:
embed subsequent L1 bits of remaining bits of the message in L1 subsequent available indices of the second least significant bit plane, the available indices being restricted by binary expressions of the N indices.

20. The system of claim 14, the controller controlling the LUT and image rearrangement circuit, routine or application to:
embed a message having a length of (N/2)*log2(N) bits.

21. The system of claim 14, wherein, when the message has a length of N1 bits, N1 being an integer great than N, the controller further controlling the LUT and image rearrangement circuit, routine or application to:

replicate values of the LUT; and add N2 indices to the set of indices, the added N2 indices indicating positions of the replicated in the LUT, wherein N2 is an integer equal to or greater than N1-N.

22. The system of claim 14, the data set being an image, the image having pixels, each pixel being associated with one of the plurality of values via one of a set of indices, each index indicating a position of the associated value in the LUT, the system further comprising:

a bit stream generating circuit, routine or application that reconstructs the image by replacing the indices at the pixels with the respective associated values, and converts the reconstructed image into a bit stream representation by scanning bits of the pixels in a predefined order;

a characteristic generating circuit, routine or application that determines a characteristic of the image from the bit stream representation;

an encryptor that encrypts the characteristic using a private key; and an ancillary information generating circuit, routine or application that generates the message based on the encrypted characteristic.

23. The system of claim 22, wherein the characteristic is a CRC or hash function of the bit stream representation.

24. The system of claim 22, the controller controlling the ancillary information generating circuit, routine or application to:

transform the characteristic into a transformed function; and encrypt the transformed function with the private key.

25. The system of claim 22, the controller controlling the ancillary information generating circuit, routine or application to:

obtain a message authentication code (MAC) based on the encrypted characteristic; and generate the message based on the message authentication code (MAC).

26. The system of claim 14, the data set being an image, the image having pixels, each pixel being associated with one of the plurality of values via one of a set of indices, each index indicating a position of the associated value in the LUT, the controller controlling the LUT and image rearranging circuit, routine or application to:

determine an order of the set of indices in the LUT; and alter the determined order into an altered order.

27. An authentication apparatus comprising the system of claim 14.

* * * * *